(12) United States Patent
Zeng et al.

(10) Patent No.: US 10,721,042 B2
(45) Date of Patent: Jul. 21, 2020

(54) UPLINK REFERENCE SIGNAL TRANSMISSION METHOD AND APPARATUS

(71) Applicant: Huawei Technologies Co., Ltd., Shenzhen (CN)

(72) Inventors: Kun Zeng, Chengdu (CN); Guangjian Wang, Chengdu (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/252,831

(22) Filed: Jan. 21, 2019

(65) Prior Publication Data
US 2019/0158246 A1 May 23, 2019

Related U.S. Application Data

(63) Continuation of application No. PCT/CN2017/087206, filed on Jun. 5, 2017.

(30) Foreign Application Priority Data

Jul. 22, 2016 (CN) .......................... 2016 1 0585106

(51) Int. Cl.
  *H04L 5/00* (2006.01)
  *H04W 72/04* (2009.01)
  (Continued)

(52) U.S. Cl.
  CPC ........... *H04L 5/0048* (2013.01); *H04W 24/10* (2013.01); *H04W 56/001* (2013.01);
  (Continued)

(58) Field of Classification Search
  CPC .... H04L 5/0048; H04W 72/04; H04W 24/10; H04W 56/001; H04W 72/0413; H04W 72/0446
  See application file for complete search history.

(56) References Cited

U.S. PATENT DOCUMENTS

2011/0044215 A1  2/2011  Kim et al.
2012/0231790 A1  9/2012  Lindoff et al.
(Continued)

FOREIGN PATENT DOCUMENTS

CN    102857957 A   1/2013
CN    104955066 A   9/2015
(Continued)

OTHER PUBLICATIONS

Cahan, Amos et al., "Clinical experience did not reduce the variance in physicians' estimates of pretest probability in a cross-sectional survey", Journal of Clinical Epidemiology, vol. 58, No. 11, XP5108923, Nov. 2005, pp. 1211-1216.
(Continued)

*Primary Examiner* — Ronald B Abelson
(74) *Attorney, Agent, or Firm* — Slater Matsil, LLP

(57) ABSTRACT

The present application discloses an uplink reference signal transmission method and apparatus. The method includes: determining, by a terminal, a time domain resource sending position of an uplink reference signal, where there is a guard interval at a first end of the uplink reference signal; and after arriving at the time domain resource sending position, switching, in a first sequence, transmit beams in different time slices in M time slices at a first time interval corresponding to the uplink reference signal, to transmit the uplink reference signal, and switching, in a second sequence, transmit beams in different time slices in the M time slices at a second time interval corresponding to the uplink reference signal, to transmit the uplink reference signal, where the uplink reference signal includes uplink reference signals transmitted in the M different time slices.

20 Claims, 21 Drawing Sheets

(51) Int. Cl.
*H04W 24/10* (2009.01)
*H04W 56/00* (2009.01)

(52) U.S. Cl.
CPC ....... *H04W 72/04* (2013.01); *H04W 72/0413* (2013.01); *H04W 72/0446* (2013.01)

(56) References Cited

U.S. PATENT DOCUMENTS

| | | |
|---|---|---|
| 2013/0235851 A1 | 9/2013 | Abu-Surra et al. |
| 2015/0304868 A1 | 10/2015 | Yu et al. |
| 2016/0248607 A1 | 8/2016 | Choi et al. |

FOREIGN PATENT DOCUMENTS

| | | |
|---|---|---|
| CN | 105794162 A | 7/2016 |
| EP | 2536087 A1 | 12/2012 |
| WO | 2018014666 A1 | 1/2018 |

OTHER PUBLICATIONS

NTT Docomo, "Discussion on Multi-Antenna Transmission of Synchronization and Reference Signals," 3GPP TSG RAN WG1 Meeting #85, R1-165180, Nanjing, China May 23-27, 2016, 5 pages.

Samsung, "Framework for beamformed access," 3GPP TSG RAN WG1 #85, R1-164013, Nanjing, China May 23-27, 2016, 4 pages.

UPLINK REFERENCE SIGNAL TRANSMISSION METHOD AND APPARATUS

CROSS-REFERENCE TO RELATED APPLICATIONS

This application is a continuation of International Application No. PCT/CN2017/087206, filed on Jun. 5, 2017, which claims priority to Chinese Patent Application No. 201610585106.1, filed on Jul. 22, 2016. The disclosures of the aforementioned applications are hereby incorporated by reference in their entireties.

TECHNICAL FIELD

The present application relates to the field of wireless technologies, and in particular, to an uplink reference signal transmission method and apparatus.

BACKGROUND

In hybrid networking of a high frequency base station and a low frequency base station, also referred to as heterogeneous networking (HetNet) of the high frequency base station and the low frequency base station, the low frequency base station covers a relatively large area, and the high frequency base station provides hotspot coverage in the coverage of the low frequency base station, to improve a capacity of a hotspot region. In this networking mode, system overheads of control signaling transmission on a high-frequency directional link can be reduced using a wide coverage capability of the low frequency base station, and therefore this networking mode is a key deployment scenario in future 5G.

In an existing LTE system, Softcell networking is a typical HetNet networking solution. In the Softcell networking, a micro/pico base station (micro/pico BS) reuses a cell ID of a macro base station (macro BS). In other words, the micro base station is transparent for a terminal. When accessing a network, the terminal knows only an ID of an entire HetNet cell or a macro base station ID, and does not need to know a micro base station that serves the terminal. In this networking solution, to implement synchronization between the terminal and the micro base station, the existing technical solution is as follows.

(1) The terminal completes a downlink synchronization process with the macro base station by detecting a primary/secondary synchronization signal (PSS/SSS) of a cell, to obtain a synchronization clock on a network side.

(2) The terminal completes an uplink physical random access process to obtain an uplink timing advance (TA) from the terminal to the macro base station.

(3) Downlink synchronization and an uplink timing advance between the terminal and each micro base station directly reuse a result between the terminal and the macro base station. In the LTE system, a minimum cyclic prefix (CP) length of a symbol is 40.69 µs. It is assumed that a coverage radius of the macro base station is 500 m, a coverage radius of the micro base station is 100 m, a maximum latency difference between the macro base station and the micro base station does not exceed 1.33 µs, and a maximum latency difference obtained when different terminals arrive at the micro base station does not exceed 0.33 µs. Therefore, impact caused by the latency difference can be eliminated using a CP.

In this networking solution, to enable the network side to select a micro base station (for example: a Transmission Point (TP)) or micro base station set that serves the terminal, the existing technical solution is as follows.

(1) The macro base station or a network controller of a HetNet network allocates, to a target terminal, a sending resource carrying an uplink measurement reference signal and another signal.

(2) The terminal sends a specified uplink measurement reference signal using the specified resource.

(3) The network side such as a micro base station adjacent to the terminal in the HetNet performs measurement based on the uplink measurement reference signal, for example, measures reference signal received power (RSRP), to determine the serving micro base station/micro base station set to which the terminal belongs.

However, the foregoing solutions are not applicable to a scenario in which a micro base station is a high frequency base station, because a length of a high frequency symbol is of a microsecond level, for example, 1.25 µs, and a CP length is usually ⅕ of a symbol length, namely, 0.25 µs. Based on previous latency difference estimation, this CP length is not enough to eliminate impact caused by the latency difference between the macro base station and the micro base station and the TA latency difference of different terminals.

FIG. 1 describes the impact brought by the two types of latency differences.

Q1: Although time synchronization and uplink timing advance processes are completed between a terminal and a low frequency macro base station (an eNB in FIG. 1), in other words, a signal sent by a network side clock to the eNB and a signal sent by UE to the eNB in FIG. 1 are aligned in terms of time, when this result is reused on a micro base station, a random latency difference is caused when uplink transmission signals of different terminals (UE 1 and UE 2 in the figure) arrive at a micro base station (TP 1 in the figure). The latency difference damages time domain orthogonality of an uplink measurement reference signal and also interferes with a data part of the uplink measurement reference signal.

Q2: In addition, even for a single terminal (the UE 1 in the figure), when a result that the terminal is aligned with the macro base station in terms of time is reused on the micro base station (the TP 1 in the figure), a latency difference is caused between a low frequency macro base station and a high frequency micro base station because of different path propagation distances. This latency difference causes beam detection missing, and consequently a reference signal sent using a specific beam cannot be completely received.

Therefore, in a HetNet hybrid networking scenario in which a micro base station is a high frequency base station and a macro base station is a low frequency base station, a problem exists that an uplink reference signal cannot be correctly transmitted because synchronization and a TA between a terminal and a macro base station cannot be reused between the terminal and a high frequency micro base station. How to design an uplink reference signal transmission solution to ensure uplink reference signal transmission accuracy is an urgent problem to be resolved.

SUMMARY

Embodiments of the present application provide an uplink reference signal transmission method and apparatus, to implement complete uplink reference signal transmission, and improve data transmission accuracy.

Specific technical solutions provided in the embodiments of the present application are as follows.

According to a first aspect, an uplink reference signal transmission method is provided. The method includes determining, by a terminal, a time domain resource sending position of an uplink reference signal of the terminal on a high frequency link, where there is a guard interval at at least one end of the uplink reference signal. The method also includes, after arriving at the time domain resource sending position, switching, by the terminal in a first sequence, transmit beams in different time slices in M time slices at a first time interval corresponding to the uplink reference signal, to transmit the uplink reference signal, and switching, in a second sequence, transmit beams in different time slices in the M time slices at a second time interval corresponding to the uplink reference signal, to transmit the uplink reference signal. The uplink reference signal includes uplink reference signals transmitted in the M different time slices, M is a positive integer greater than 1, the second sequence is a cyclic shift of the first sequence, and the reference signals formed in the M time slices may be continuously transmitted in terms of time, or may be classified into a plurality of intervals for distributed transmission.

In this way, when the uplink reference signal is sent on a terminal side, a beam detection missing problem is overcome using a cyclic shift of a transmit beam, so that complete transmission of the uplink reference signal can be implemented, signal transmission accuracy can be improved, and system overheads can be reduced.

With reference to the first aspect, optionally, in a possible design, the first time interval corresponding to the uplink reference signal falls within an odd-numbered transmission time interval of uplink measurement at which the uplink reference signal is located, and the second time interval corresponding to the uplink reference signal falls within an even-numbered transmission time interval of uplink measurement at which the uplink reference signal is located.

With reference to the first aspect, optionally, in a possible design, the guard interval is duration in which the terminal does not transmit a signal. Because terminals perform asynchronous transmission, the guard interval can prevent an uplink reference signal transmitted by a terminal from interfering with a signal transmitted by another terminal.

With reference to the first aspect, optionally, in a possible design, the uplink reference signal includes a synchronization reference signal and/or an uplink measurement reference signal, and the uplink measurement reference signal includes a sounding reference signal. The synchronization reference signal is used to implement uplink synchronization between the terminal and a high frequency base station, and the measurement reference signal is used to measure channel state information between the terminal and the high frequency base station.

With reference to the first aspect, optionally, in a possible design, a length of the guard interval is not less than a half of an uplink timing advance from the terminal to any high frequency base station.

With reference to the first aspect, optionally, in a possible design, the determining, by a terminal, a time domain resource sending position of an uplink reference signal of the terminal on a high frequency link includes: obtaining, by the terminal, a system clock of a low frequency base station based on a low frequency link, and determining a start point position, indicated by the system clock, of a timeslot of the low frequency link as the time domain resource sending position of the uplink reference signal of the terminal on the high frequency link; or obtaining, by the terminal, a system clock of a low frequency base station and an uplink timing advance of the terminal on a low frequency link based on the low frequency link, and determining, as the time domain resource sending position of the uplink reference signal of the terminal on the high frequency link, a position that is the uplink timing advance after a start point, indicated by the system clock, of a timeslot of the low frequency link; or receiving, by the terminal, indication information of the time domain resource sending position that is sent by a network side.

With reference to the first aspect, optionally, in a possible design, the transmitting, by the terminal, the uplink reference signal includes: generating a radio frame, where the radio frame includes at least one network-oriented measurement timeslot interval, and the network-oriented measurement timeslot interval includes the guard interval and a symbol used for uplink reference signal transmission; and sending the radio frame to transmit the uplink reference signal.

In this radio frame structure, the guard interval may be placed at either end or both ends of the symbol used for uplink reference signal transmission.

According to a second aspect, an uplink reference signal transmission method is provided. The method includes: determining, by a high frequency base station, N time slices that are used to receive an uplink reference signal transmitted by a terminal in a single time slice of the terminal, where N is a positive integer greater than 1. The method also includes switching, by the high frequency base station in a first sequence, receive beams in different time slices in the N time slices at a first time interval corresponding to the uplink reference signal, to receive the uplink reference signal transmitted by the terminal in the single time slice of the terminal, and switching, in a second sequence, receive beams in different time slices in the N time slices at a second time interval corresponding to the uplink reference signal, to receive the uplink reference signal transmitted by the terminal in the single time slice of the terminal, where there is a guard interval at at least one end of the uplink reference signal.

In this way, when the uplink reference signal is received on a base station side, a beam detection missing problem is overcome using a cyclic shift of a receive beam, so that complete transmission of the uplink reference signal can be implemented, signal transmission accuracy can be improved, and system overheads can be reduced.

With reference to the second aspect, optionally, in a possible design, the first time interval corresponding to the uplink reference signal falls within an odd-numbered transmission time interval of uplink measurement at which the uplink reference signal is located, and the second time interval corresponding to the uplink reference signal falls within an even-numbered transmission time interval of uplink measurement at which the uplink reference signal is located.

According to a third aspect, an uplink reference signal transmission apparatus is provided. The apparatus includes a determining unit, configured to determine a time domain resource sending position of an uplink reference signal of a terminal on a high frequency link, where there is a guard interval at at least one end of the uplink reference signal. The apparatus also includes a sending unit, configured to: after arriving at the time domain resource sending position, switch, in a first sequence, transmit beams in different time slices in M time slices at a first time interval corresponding to the uplink reference signal, to transmit the uplink reference signal, and switch, in a second sequence, transmit beams in different time slices in the M time slices at a second time interval corresponding to the uplink reference signal, to transmit the uplink reference signal. The uplink reference signal includes uplink reference signals transmitted in the M different time slices, M is a positive integer greater than 1, and the second sequence is a cyclic shift of the first sequence.

With reference to the third aspect, optionally, in a possible design, the first time interval corresponding to the uplink reference signal falls within an odd-numbered transmission time interval of uplink measurement at which the uplink reference signal is located, and the second time interval corresponding to the uplink reference signal falls within an even-numbered transmission time interval of uplink measurement at which the uplink reference signal is located.

With reference to the third aspect, optionally, in a possible design, the guard interval is duration in which the terminal does not transmit a signal.

With reference to the third aspect, optionally, in a possible design, the uplink reference signal includes a synchronization reference signal and/or an uplink measurement reference signal, and the uplink measurement reference signal includes a sounding reference signal.

With reference to the third aspect, optionally, in a possible design, a length of the guard interval is not less than a half of an uplink timing advance from the terminal to any high frequency base station.

With reference to the third aspect, optionally, in a possible design, when determining the time domain resource sending position of the uplink reference signal of the terminal on the high frequency link, the determining unit is specifically configured to: obtain a system clock of a low frequency base station based on a low frequency link, and determine a start point position, indicated by the system clock, of a timeslot of the low frequency link as the time domain resource sending position of the uplink reference signal of the terminal on the high frequency link; or obtain a system clock of a low frequency base station and an uplink timing advance of the terminal on a low frequency link based on the low frequency link, and determine, as the time domain resource sending position of the uplink reference signal of the terminal on the high frequency link, a position that is the uplink timing advance after a start point, indicated by the system clock, of a timeslot of the low frequency link; or receive indication information of the time domain resource sending position that is sent by a network side.

With reference to the third aspect, optionally, in a possible design, when transmitting the uplink reference signal, the sending unit is specifically configured to: generate a radio frame, where the radio frame includes at least one network-oriented measurement timeslot interval, and the network-oriented measurement timeslot interval includes the guard interval and a symbol used for uplink reference signal transmission; and send the radio frame to transmit the uplink reference signal.

According to a fourth aspect, an uplink reference signal transmission apparatus is provided. The apparatus includes: a determining unit, configured to determine N time slices that are used to receive an uplink reference signal transmitted by a terminal in a single time slice of the terminal, where N is a positive integer greater than 1. The apparatus also includes a receiving unit, configured to switch, in a first sequence, receive beams in different time slices in the N time slices at a first time interval corresponding to the uplink reference signal, to receive the uplink reference signal transmitted by the terminal in the single time slice of the terminal, and switch, in a second sequence, receive beams in different time slices in the N time slices at a second time interval corresponding to the uplink reference signal, to receive the uplink reference signal transmitted by the terminal in the single time slice of the terminal, where there is a guard interval at at least one end of the uplink reference signal.

With reference to the fourth aspect, optionally, in a possible design, the first time interval corresponding to the uplink reference signal falls within an odd-numbered transmission time interval of uplink measurement at which the uplink reference signal is located, and the second time interval corresponding to the uplink reference signal falls within an even-numbered transmission time interval of uplink measurement at which the uplink reference signal is located.

According to a fifth aspect, a terminal device is provided, and the terminal device has a function of implementing behavior of the terminal in any one of the foregoing aspects and possible designs. The function may be implemented by hardware, or may be implemented by hardware by executing corresponding software. The hardware or software includes one or more modules corresponding to the foregoing function.

In a possible design, a structure of the terminal device includes a transceiver, a memory, and a processor. The memory is configured to store a group of programs, and the processor is configured to invoke the programs stored in the memory, to perform the method according to any one of the foregoing aspects and designs.

According to a sixth aspect, a base station is provided, and the base station has a function of implementing behavior of the high frequency base station in any one of the foregoing aspects and possible designs. The function may be implemented by hardware, or may be implemented by hardware by executing corresponding software. The hardware or software includes one or more modules corresponding to the foregoing function.

In a possible design, a structure of the base station includes a transceiver, a memory, and a processor. The memory is configured to store a group of programs, and the processor is configured to invoke the programs stored in the memory, to perform the method according to any one of the foregoing aspects and designs.

In the uplink reference signal transmission solution provided in the present application, using a cyclic shift of a transmit beam on the terminal side or a cyclic shift of a receive beam on the base station side, the beam detection missing problem is overcome in an uplink reference signal transmission process, thereby implementing complete transmission of the uplink reference signal, improving signal transmission accuracy, and reducing system overheads.

DETAILED DESCRIPTION OF ILLUSTRATIVE EMBODIMENTS

The following describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
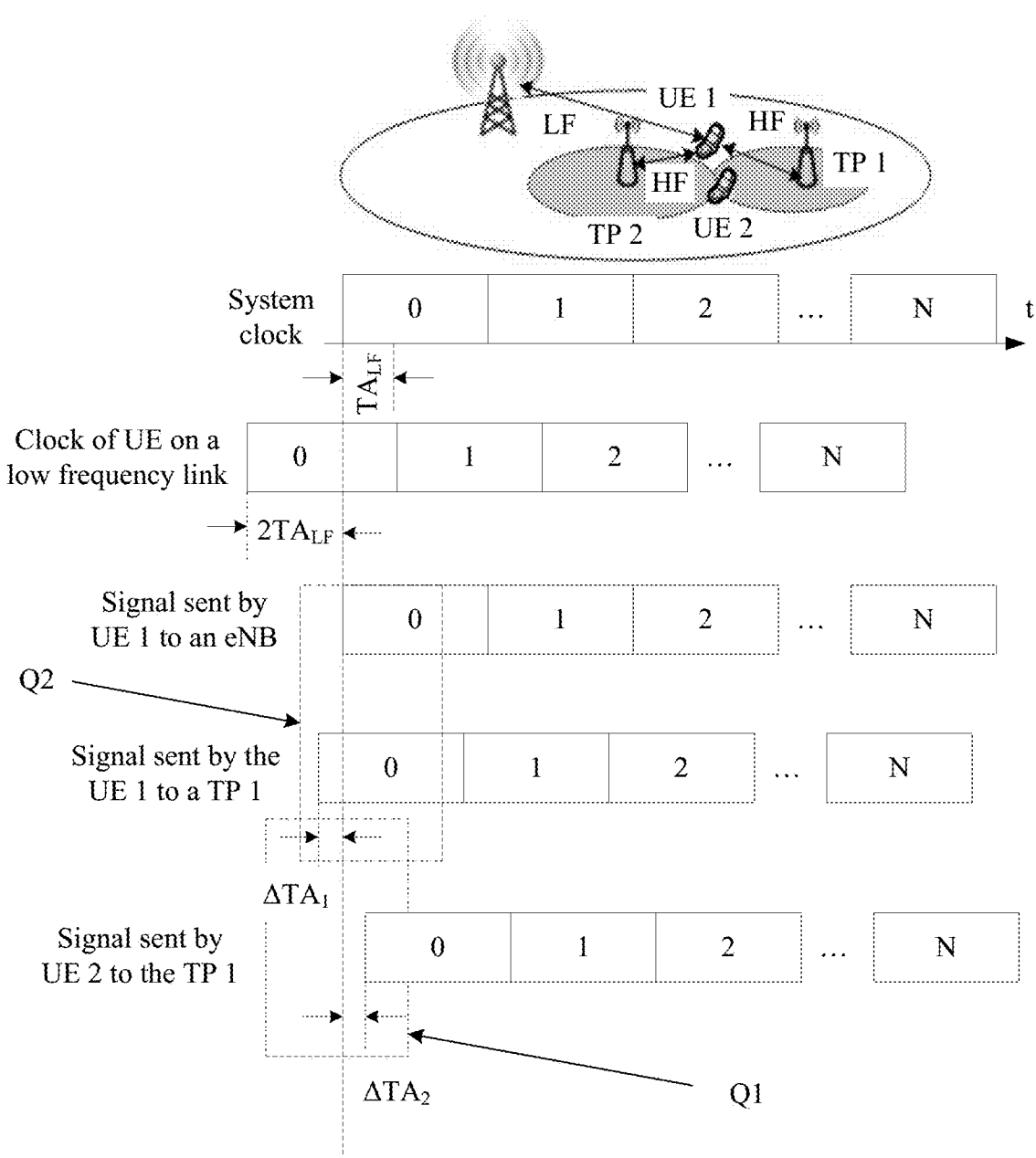
FIG. 1 is a schematic diagram of impact caused by a latency difference between macro and micro base stations in a HetNet scenario.
Figure 2:
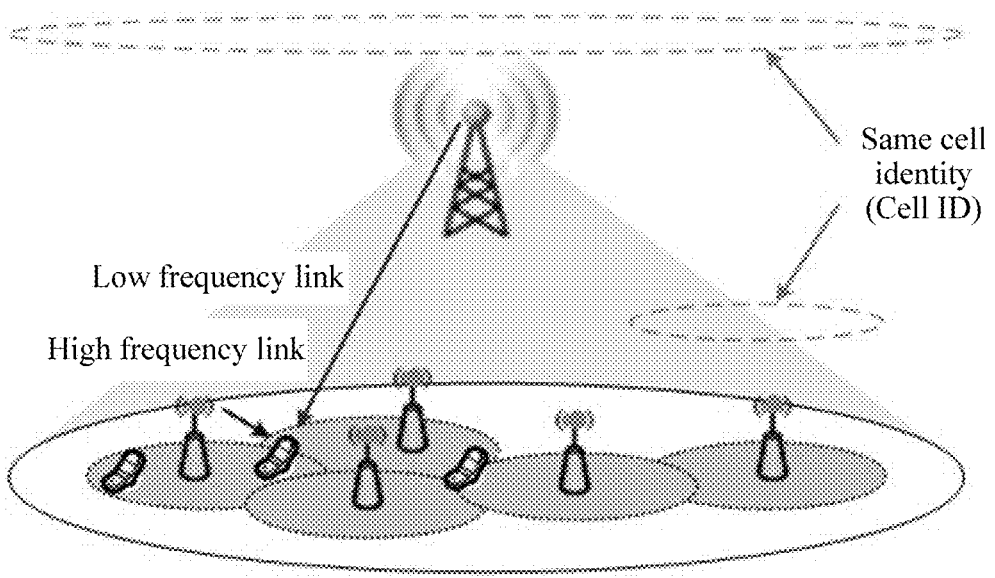
FIG. 2 is a schematic diagram of an application scenario according to the present application.

FIG. 2 is a schematic diagram of an application scenario according to an embodiment of the present application. The application scenario specifically includes a terminal, a low frequency macro base station, and at least one high frequency micro base station. Optionally, there may be a low frequency micro base station in this scenario. The high frequency micro base station relies on the low frequency macro base station to implement some transmission functions. The terminal is equipped with both a low frequency transceiver and a high frequency transceiver. The low frequency transceiver performs data communication with the low frequency macro base station using a low frequency link, and the high frequency transceiver performs data communication with the high frequency micro base station using a high frequency link.

Figure 3:
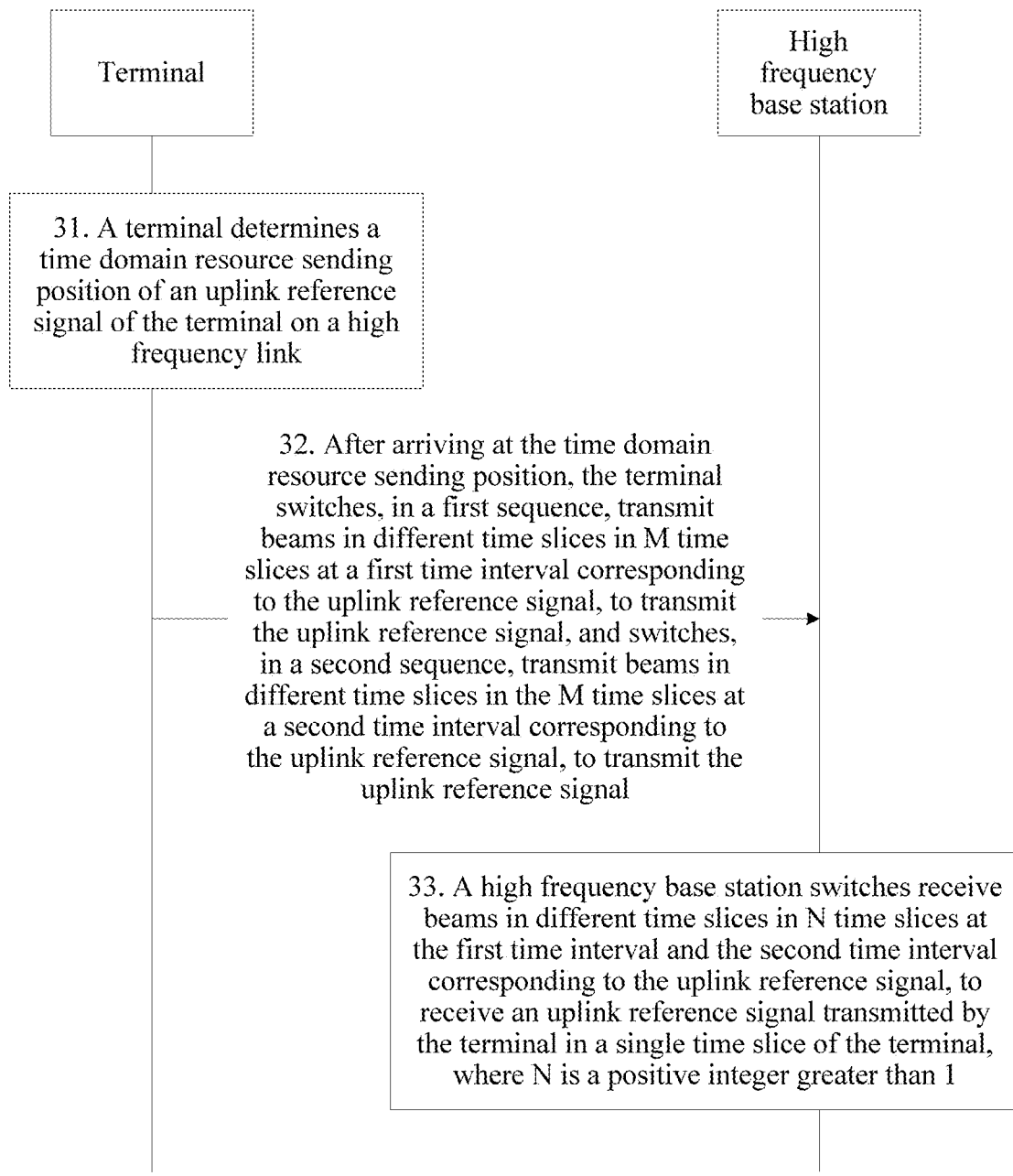
FIG. 3 is a flowchart of an uplink reference signal transmission method according to an embodiment of the present application.

Based on the schematic diagram of the application scenario shown in FIG. 2, an embodiment of the present application provides an uplink reference signal transmission method. As shown in FIG. 3, a specific procedure includes the following steps.

Step 31: A terminal determines a time domain resource sending position of an uplink reference signal of the terminal on a high frequency link, where there is a guard interval at at least one end of the uplink reference signal.

The high frequency link is a communication link between the terminal and a high frequency base station, and the high frequency link is used for high frequency band transmission. Usually, a frequency band greater than 6 GHz is referred to as a high frequency band. Certainly, the high frequency band may alternatively be specifically set based on a specific networking environment of the terminal.

Specifically, the terminal may determine the time domain resource sending position of the uplink reference signal of the terminal on the high frequency link in the following three manners.

Manner 1: The terminal obtains a system clock of a low frequency base station based on a low frequency link, and determines a start point position, indicated by the system clock, of a timeslot of the low frequency link as the time domain resource sending position of the uplink reference signal of the terminal on the high frequency link.

Manner 2: The terminal obtains a system clock of a low frequency base station and an uplink timing advance of the terminal on a low frequency link based on the low frequency link, and determines, as the time domain resource sending position of the uplink reference signal of the terminal on the high frequency link, a position that is the uplink timing advance after a start point, indicated by the system clock, of a timeslot of the low frequency link.

Manner 3: The terminal receives indication information of the time domain resource sending position that is sent by a network side.

Figure 4:
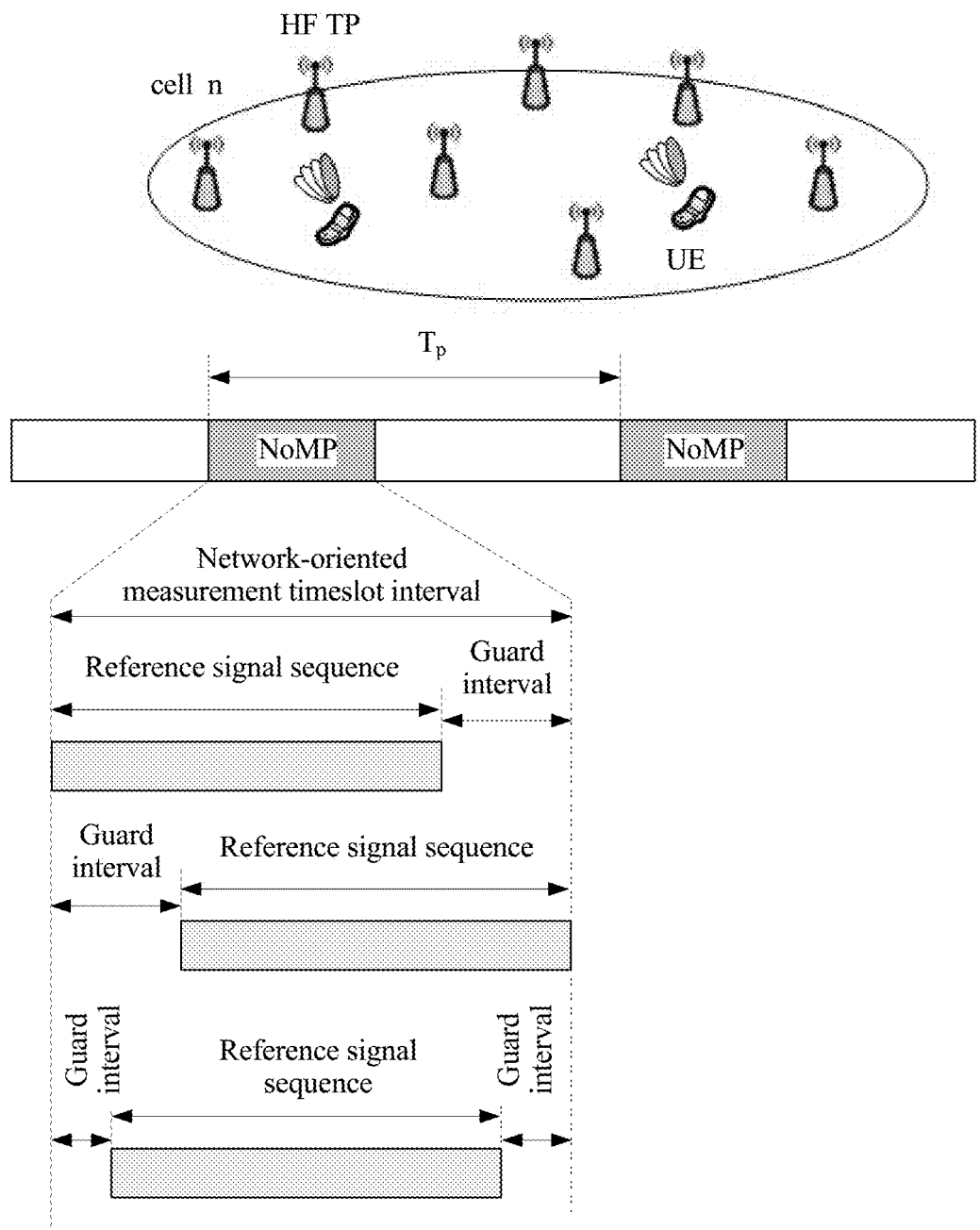
FIG. 4 is a schematic diagram of a guard interval placement position according to an embodiment of the present application.

The uplink reference signal is periodically and intensively transmitted in a network-oriented measurement timeslot (NoMT) interval. Optionally, the NoMT is placed in a radio frame. Specifically, one radio frame may include one or more NoMTs, or one radio frame every a plurality of radio frames includes the NoMT. The NoMT includes an uplink reference signal and a guard interval, and the uplink reference signal and the guard interval are specifically placed in three manners. As shown in FIG. 4, the guard interval may be placed at either end of the reference signal, or may be placed at both ends of the reference signal, and the terminal does not transmit any signal within a time period of the guard interval.

It should be noted that a length of the guard interval is determined based on a specific deployment scenario of a macro base station and a micro base station in a HetNet network. The length of the guard interval is not less than ½ of an uplink TA from the terminal to any high frequency micro base station. In other words, $L \geq \max|TA_i/2|$, where L is the length of the guard interval, and $TA_i$ is the uplink TA from the terminal to any high frequency micro base station. The uplink TA from the terminal to any high frequency micro base station is obtained through estimation using an uplink TA from the terminal to a low frequency macro base station, position information of the high frequency micro base station, and position information of the low frequency macro base station. Alternatively, the guard interval and the length of the guard interval may be not specified. That there is the guard interval at the at least one end of the reference signal can be implicitly determined using an NoMT interval length and a reference signal length, so as to determine the length of the guard interval.

The uplink reference signal includes a synchronization reference signal and/or an uplink measurement reference signal. The synchronization reference signal is used to implement uplink synchronization between the terminal and the high frequency base station, and the uplink measurement reference signal is used to measure channel state information between the terminal and the high frequency base station, for example, detecting signal strength at a receive end. The uplink measurement reference signal includes a sounding reference signal (SRS) sent by the terminal. The high frequency base station may implement uplink channel estimation by measuring the SRS, and allocate uplink resources based on the estimation. It can be learned that the SRS is extremely important for uplink channel estimation to dynamically allocate uplink resources. In addition, the SRS may also be used for operations such as uplink timing of the terminal and reciprocity-assisted downlink beamforming, and is also extremely important for these operations.

Step 32: After arriving at the time domain resource sending position, the terminal switches, in a first sequence, transmit beams in different time slices in M time slices at a first time interval corresponding to the uplink reference signal, to transmit the uplink reference signal, and switches, in a second sequence, transmit beams in different time slices in the M time slices at a second time interval corresponding to the uplink reference signal, to transmit the uplink reference signal, where the uplink reference signal includes uplink reference signals transmitted in the M different time slices, M is a positive integer greater than 1, and the second sequence is a cyclic shift of the first sequence.

A corresponding time length for transmitting the uplink reference signal is divided into M time slices, and lengths of the time slices are the same, and may be one symbol, or may be a plurality of (≥2) symbols. A quantity of time slices corresponding to the uplink reference signal may be specified in advance, or may be specifically determined based on a quantity of transmit beams of the terminal.

Figure 5:
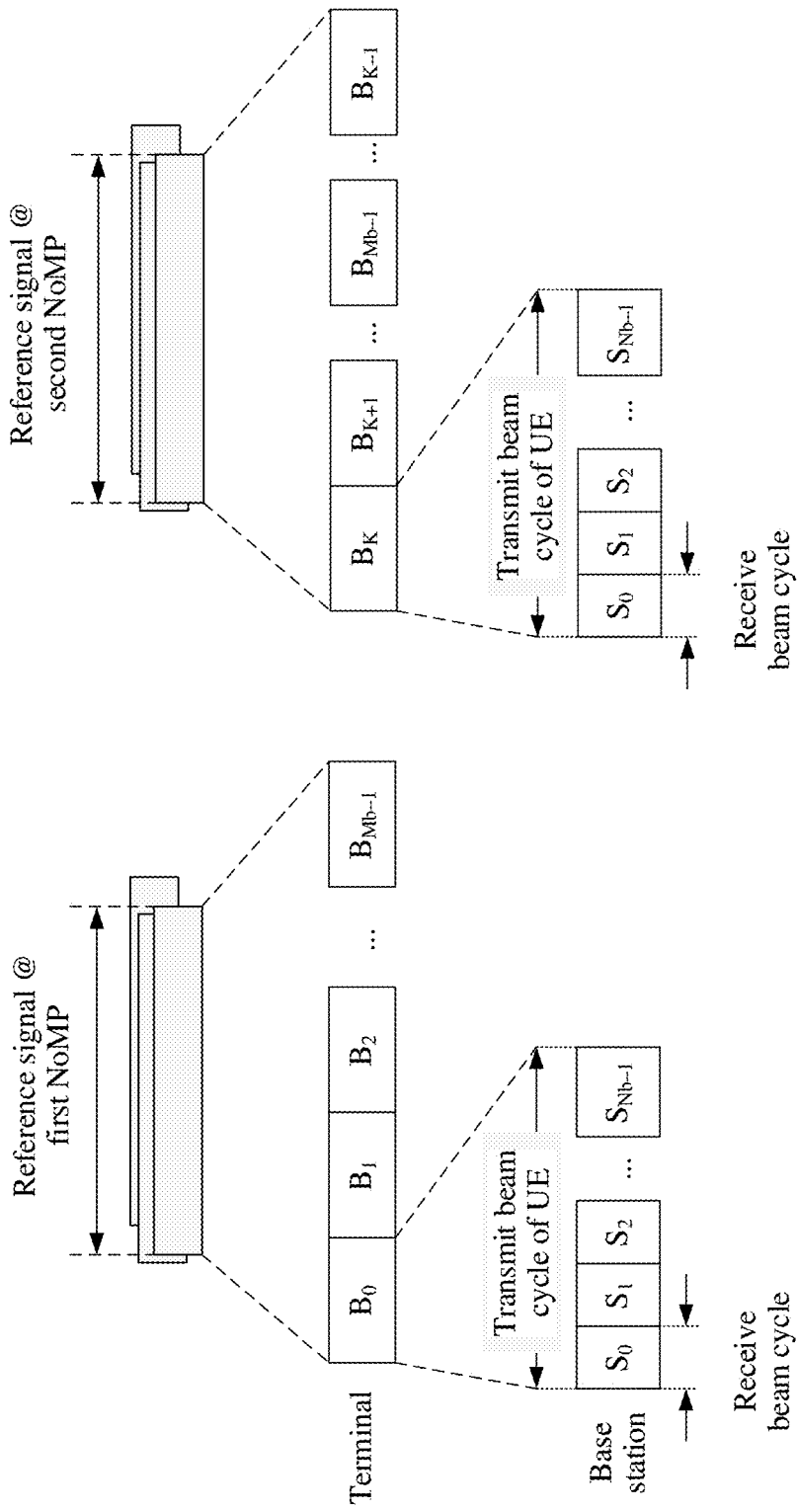
FIG. 5 is a schematic diagram of uplink reference signal transmission between a terminal and a high frequency micro base station according to an embodiment of the present application.

FIG. 5 is a schematic diagram of uplink reference signal transmission between a terminal and a high frequency micro base station. On a terminal side, the terminal sends an uplink reference signal in each time slice using a different transmit beam. For example, the terminal sends a reference signal in a time slice $B_0$ using a transmit beam #0, and sends a reference signal in a time slice $B_1$ using a transmit beam #1. Specifically, the terminal may send the uplink reference signal in the following two manners.

A first manner is a centralized sending manner. In this case, the quantity M of time slices corresponding to the uplink reference signal of the terminal is not less than a minimum quantity of transmit beams required by the terminal to transmit the uplink reference signal in a specific directional area. For example, if the terminal needs to cover an area from 0° to 60°, and a beam width is 10°, at least six transmit beams are required, and a value of M needs to be greater than or equal to 6.

A second manner is a distributed sending manner. In this case, the quantity M of time slices corresponding to the uplink reference signal of the terminal is less than a minimum quantity of transmit beams required by the terminal to transmit the uplink reference signal in a specific directional area, but the minimum quantity of transmit beams required by the terminal to transmit the uplink reference signal in the specific directional area may be reached using a plurality of reference signals.

In addition, the terminal needs to select a different transmit beam in each time slice to send at least one uplink reference signal in a synchronization reference signal and a measurement reference signal, and optionally, further needs to send an identity of the terminal.

The first time interval corresponding to the uplink reference signal falls within an odd-numbered transmission time interval (TTI) of uplink measurement at which the uplink reference signal is located, and the second time interval corresponding to the uplink reference signal falls within an even-numbered transmission time interval of uplink measurement at which the uplink reference signal is located.

In FIG. 5, a first NoMT is the first time interval corresponding to the uplink reference signal, and a second NoMT is the second time interval corresponding to the uplink reference signal. The terminal switches, in the first sequence, the transmit beams of the terminal in M time slices corresponding to a reference signal in the first NoMT. As shown in FIG. 5, the terminal sequentially sends uplink reference signals based on logical sequence numbers #0 to #(Mb−1) of the transmit beams. The terminal switches, in the second sequence obtained after cyclic shift, the transmit beams of the terminal in M time slices corresponding to a reference signal in the second NoMT. As shown in FIG. 5, first K cyclic beams of the reference signal are switched after the first K cyclic beams are shifted to #(Mb−1). To be specific, logical sequence numbers of transmit beams sent by each UE in the second NoMT are # K, #(K+1), . . . , #(Mb−1), #0, . . . , and #(K−1).

It should be noted that a total length of time slices occupied by the K beams on which cyclic shift is performed needs to be greater than a maximum high-low frequency latency. Specifically, using a standard, one or more (2) values may be preset for the quantity K of beams on which cyclic shift is performed, and the high frequency base station preferably selects one value based on an indicator such as coverage.

In other words, at a time interval corresponding to the reference signal in the first NoMT, the terminal sequentially switches transmit beams in the first sequence to send the uplink reference signal, and at a time interval corresponding to a reference signal in the second NoMT, the terminal sequentially switches transmit beams in the second sequence to send the uplink reference signal.

Specifically, when one radio frame includes only one NoMT, the first NoMT and the second NoMT are respectively an NoMT in a radio frame with an even frame number and an NoMT in a radio frame with an odd frame number; or the first NoMT and the second NoMT are respectively an NoMT in a radio frame with an odd frame number and an NoMT in a radio frame with an even frame number.

Specifically, when one radio frame includes only two NoMTs, the first NoMT and the second NoMT are respectively a first NoMT and a second NoMT in a radio frame; or the first NoMT and the second NoMT are respectively a second NoMT and a first NoMT in a radio frame.

Specifically, when one radio frame includes more than two NoMTs, an even quantity of radio frames are used as a cycle, NoMTs in the cycle are numbered from 0 based on a sequential relationship, and the first NoMT and the second NoMT are respectively an even-numbered NoMT and an odd-numbered NoMT, or the first NoMT and the second NoMT are respectively an odd-numbered NoMT and an even-numbered NoMT.

Specifically, when there is one NoMT every a plurality of radio frames, radio frames corresponding to an even quantity of NoMTs are used as a cycle, the NoMTs in the cycle are numbered from 0 based on a sequential relationship, and the first NoMT and the second NoMT are respectively an even-numbered NoMT and an odd-numbered NoMT, or the first NoMT and the second NoMT are respectively an odd-numbered NoMT and an even-numbered NoMT.

Step 33: A high frequency base station switches receive beams in different time slices in N time slices at the first time interval and the second time interval corresponding to the uplink reference signal, to receive an uplink reference signal transmitted by the terminal in a single time slice of the terminal, where N is a positive integer greater than 1.

As shown in FIG. 5, on a high frequency micro base station side, in duration of the single time slice of the terminal, the high frequency micro base station further divides the single time slice into N tiny time slices, and receives, in these tiny time slices using different directional receive beams, the uplink reference signal sent by the terminal.

A length of the tiny time slice described above may be one symbol, or may be a plurality of (≥2) symbols.

It should be noted that, if a total quantity of receive beams of the high frequency micro base station is N, in duration of a single time slice of the terminal, the uplink reference signal sent by the terminal is cyclically received in the N time slices using receive beams.

Figure 7:
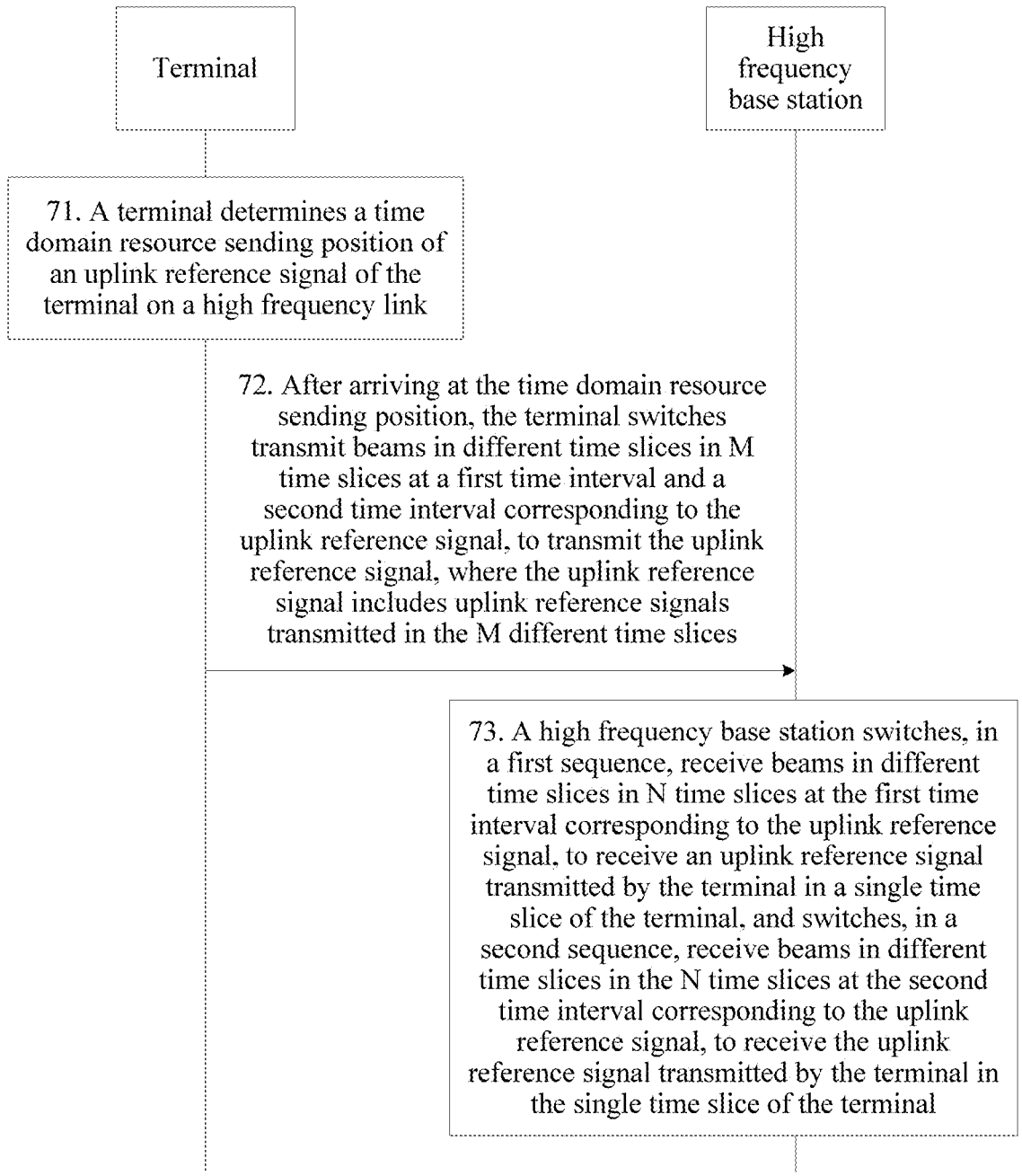
FIG. 7 is a flowchart of an uplink reference signal transmission method according to an embodiment of the present application.

Based on the schematic diagram of the application scenario shown in FIG. 2, an embodiment of the present application provides an uplink reference signal transmission method. As shown in FIG. 7, a specific procedure includes the following steps.

Step 71 is step 31 in FIG. 3. Therefore, refer to related descriptions in the foregoing method embodiment. Details are not described herein again.

Step 72: After arriving at the time domain resource sending position, the terminal switches transmit beams in different time slices in M time slices at a first time interval and a second time interval corresponding to the uplink reference signal, to transmit the uplink reference signal, where the uplink reference signal includes uplink reference signals transmitted in the M different time slices, and M is a positive integer greater than 1.

The first time interval corresponding to the uplink reference signal falls within an odd-numbered transmission time interval (TTI) of uplink measurement at which the uplink reference signal is located, and the second time interval corresponding to the uplink reference signal falls within an even-numbered transmission time interval of uplink measurement at which the uplink reference signal is located.

Figure 8:
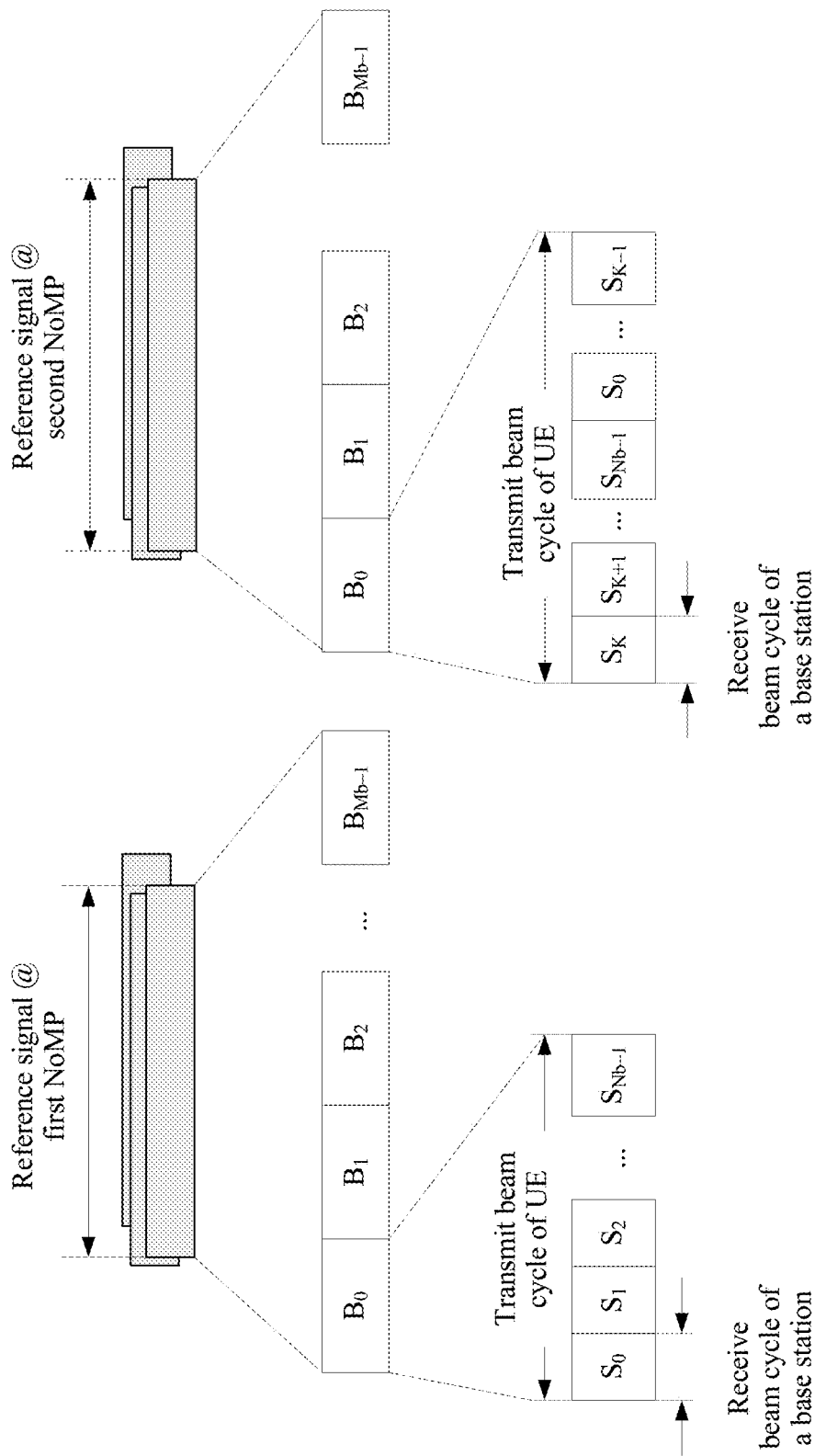
FIG. 8 is a schematic diagram of uplink reference signal transmission between a terminal and a high frequency micro base station according to an embodiment of the present application.

FIG. 8 is a schematic diagram of uplink reference signal transmission between a terminal and a high frequency micro base station. On a terminal side, the terminal sends an uplink reference signal in each time slice using a different transmit beam. For example, the terminal sends a reference signal in a time slice $B_0$ using a transmit beam #0, and sends a reference signal in a time slice $B_1$ using a transmit beam #1. Specifically, the terminal may send the uplink reference signal in the following two manners.

A first manner is a centralized sending manner. In this case, the quantity M of time slices corresponding to the uplink reference signal of the terminal is not less than a minimum quantity of transmit beams required by the terminal to transmit the uplink reference signal in a specific directional area. For example, if the terminal needs to cover an area from 0° to 60°, and a beam width is 10°, at least six transmit beams are required, and a value of M needs to be greater than or equal to 6.

A second manner is a distributed sending manner. In this case, the quantity M of time slices corresponding to the uplink reference signal of the terminal is less than a minimum quantity of transmit beams required by the terminal to transmit the uplink reference signal in a specific directional area, but the minimum quantity of transmit beams required by the terminal to transmit the uplink reference signal in the specific directional area may be reached using a plurality of reference signals.

In addition, the terminal needs to select a different transmit beam in each time slice to send at least one uplink reference signal in a synchronization reference signal and a measurement reference signal, and optionally, further needs to carry an identity of the terminal.

For the first time interval and the second time interval corresponding to the uplink reference signal, refer to the foregoing related descriptions.

In FIG. 8, a first NoMT is the first time interval corresponding to the uplink reference signal, and a second NoMT is the second time interval corresponding to the uplink reference signal. The terminal traverses the transmit beams of the terminal in the M time slices corresponding to reference signals in the first NoMT and the second NoMT, to send the uplink reference signal.

Step 73: A high frequency base station switches, in a first sequence, receive beams in different time slices in N time slices at the first time interval corresponding to the uplink reference signal, to receive an uplink reference signal transmitted by the terminal in a single time slice of the terminal, and switches, in a second sequence, receive beams in different time slices in the N time slices at the second time interval corresponding to the uplink reference signal, to receive the uplink reference signal transmitted by the terminal in the single time slice of the terminal.

As shown in FIG. 8, on a high frequency micro base station side, in duration of the single time slice of the terminal, the high frequency micro base station further divides the single time slice into N tiny time slices, and receives, in these tiny time slices using different directional receive beams, the uplink reference signal sent by the terminal.

A length of the tiny time slice described above may be one symbol, or may be a plurality of (2) symbols.

In the first NoMT, in duration in which the terminal sends a beam once, the high frequency base station switches the receive beams of the high frequency base station in the first sequence. For example, in FIG. 8, the high frequency base station sequentially receives, based on logical sequence numbers #0 to #(Nb−1) of the receive beams, uplink reference signals sent by the terminal. In the second NoMT, in duration in which the terminal sends a beam once, the high frequency base station changes a receive beam switching sequence, and switches the receive beams of the high frequency base station in a logical sequence of receive beams obtained after cyclic shift. As shown in FIG. 8, first K cyclic beams of the reference signal are switched after the first K cyclic beams are shifted to #(Nb−1). To be specific, logical sequence numbers of the receive beams on a base station side in the second NoMT are # K, #(K+1), . . . , #(Nb−1), #0, . . . , and #(K−1).

In other words, at a time interval corresponding to the reference signal in the first NoMT, each high frequency base station sequentially switches receive beams in the first sequence to receive the reference signal, and at a time interval corresponding to the reference signal in the second NoMT, each high frequency base station sequentially switches receive beams in the second sequence to receive the reference signal. The second sequence is a cyclic shift of the first sequence.

It should be noted that a total length of time slices occupied by the K beams on which cyclic shift is performed needs to be greater than a maximum high-low frequency latency. Specifically, using a standard, one or more (2) values may be preset for the quantity K of beams on which cyclic shift is performed, and the high frequency base station preferably selects one value based on an indicator such as coverage.

The uplink reference signal at the NoMT interval is divided into time slices on the terminal side. Each time slice includes symbols, and a reference signal used for synchronization or measurement is carried by these symbols. The following orthogonal design manners may be used for resource allocation methods for uplink reference signals of different terminals.

Figure 6A:
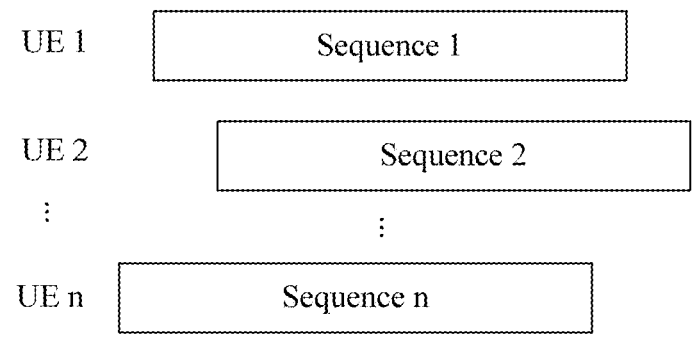
FIG. 6A, FIG. 6B, and FIG. 6C are schematic diagrams of orthogonal processing performed by a terminal on an uplink reference signal according to an embodiment of the present application.

Manner 1: Code division orthogonal manner. As shown in FIG. 6A, uplink reference signals of different terminals are encoded using different orthogonal sequences with fine cross-correlation features, so that a receive end can separate a target reference signal from time-frequency hybrid signals.

Figure 6B:
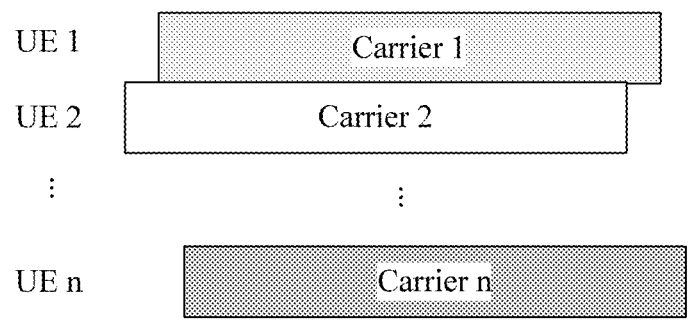

Manner 2: Frequency division orthogonal manner. As shown in FIG. 6B, for a multicarrier system, uplink reference signals of different terminals may be carried by different subcarriers of a symbol, so that interference caused by time domain misalignment is avoided through frequency division.

Figure 6C:
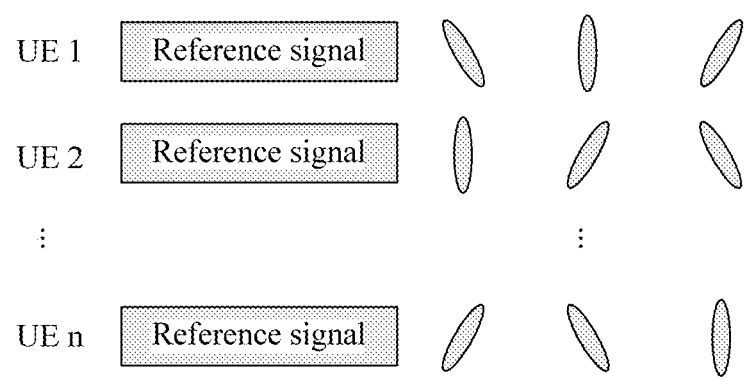

Manner 3: Wavelength division orthogonal manner. As shown in FIG. 6C, because the high frequency micro base station uses a directional beam, different terminals may send respective reference signals at a same moment using beams corresponding to different directional beams, and this method is also referred to as beam spatial multiplexing.

Manner 4: Combination of any two or three of the foregoing three manners. When there are a relatively large quantity of terminals, any two or three of the foregoing three manners may be combined. For example, the terminals are classified into groups, one orthogonal multiplexing manner is used between groups, and another orthogonal multiplexing manner is used within a group.

Figure 9:
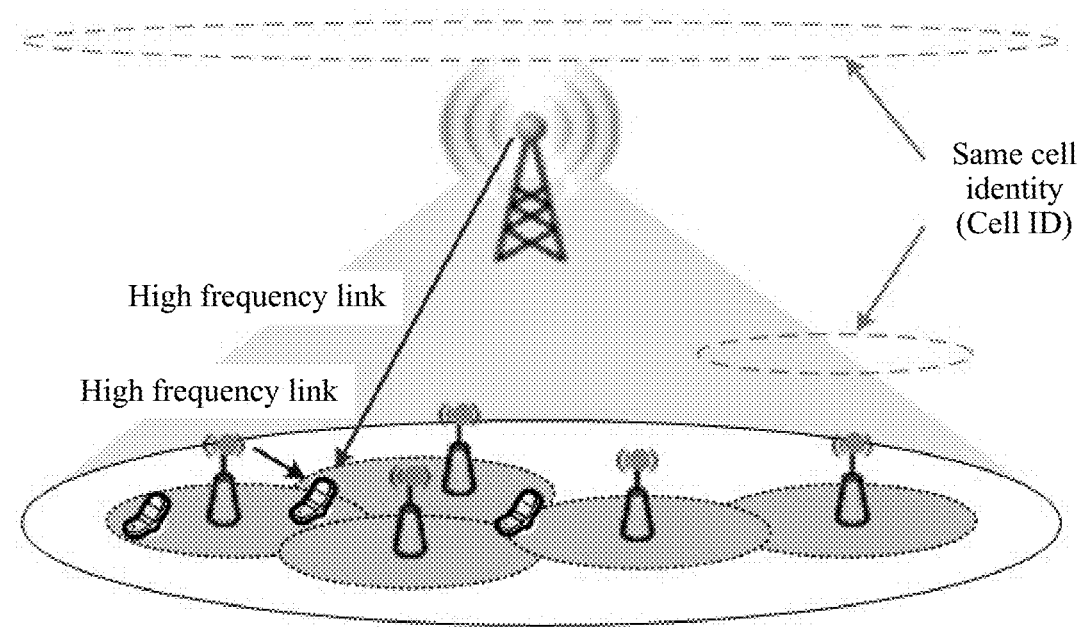
FIG. 9 is a schematic diagram of another application scenario according to the present application.

It should be noted that the uplink reference signal transmission methods shown in FIG. 3 and FIG. 7 are also applicable to a hybrid networking application scenario of a plurality of high frequency base stations shown in FIG. 9. The application scenario specifically includes a terminal and a plurality of high frequency micro base stations. In a hybrid networking scenario of a plurality of high frequency base stations, the high frequency base station may be a high frequency micro base station, or may be a high frequency macro base station.

Embodiment 1

Figure 10:
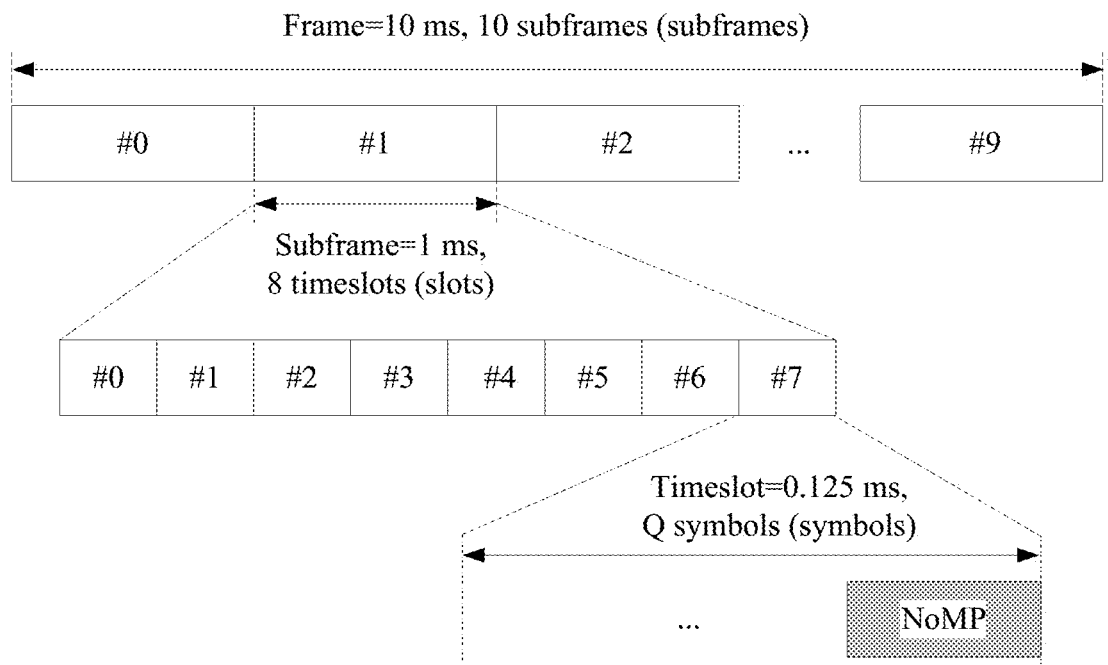
FIG. 10 is a schematic diagram of a frame structure in a communications system according to Embodiment 1 of the present application.

As shown in FIG. 10, Embodiment 1 provides a frame structure applied to a communications system of hybrid networking of a high frequency micro base station and a low frequency macro base station shown in FIG. 2 or hybrid networking of a plurality of high frequency base stations shown in FIG. 9. In a hybrid networking scenario of a plurality of high frequency base stations, the high frequency base station may be a high frequency micro base station, or may be a high frequency macro base station.

In FIG. 10, a frame length of one radio frame is 10 milliseconds. The radio frame includes 10 radio subframes with a frame length of 1 millisecond, and one radio subframe is further divided into eight timeslots with a length of 0.125 millisecond. Each timeslot includes Q symbols, and the symbol may be a single carrier symbol, or may be a multicarrier symbol, such as an OFDM symbol. A typical value of Q may be set to 7n, where n is a positive integer. These timeslots are further classified into uplink timeslots and downlink timeslots.

An NoMT in the present application is placed in an uplink timeslot of a subframe, and may be placed at a header of the uplink timeslot or at a tail of the uplink timeslot. For example, in FIG. 10, the NoMT is placed at a tail of an eighth timeslot (the timeslot is an uplink timeslot) of a second subframe.

Embodiment 2

Figure 11A:
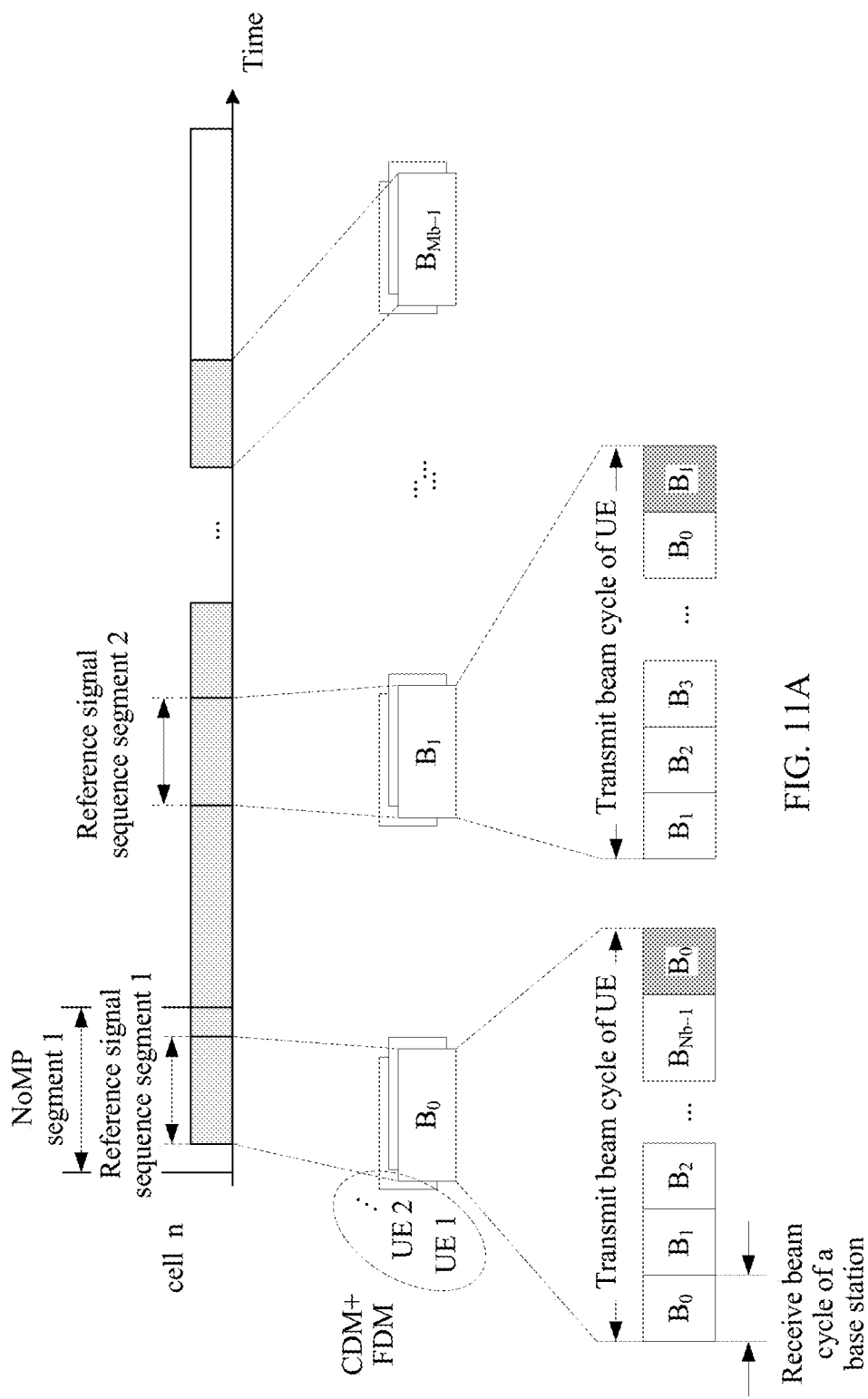
FIG. 11A is a schematic diagram of placing an uplink reference signal on a time domain resource according to Embodiment 2 of the present application.
Figure 11B:
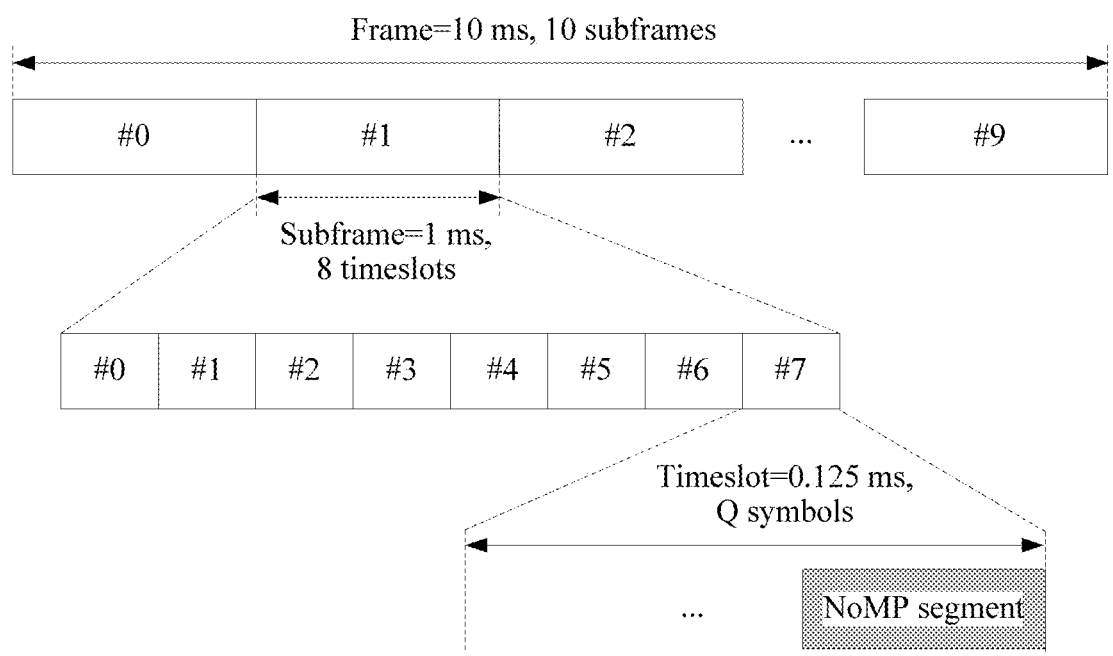
FIG. 11B is a schematic diagram of a frame structure in a communications system according to Embodiment 2 of the present application.

As shown in FIG. 11A and FIG. 11B, Embodiment 2 provides another frame structure applied to a communications system of hybrid networking of a high frequency micro base station and a low frequency macro base station shown in FIG. 2 or hybrid networking of a plurality of high frequency base stations shown in FIG. 9. In a hybrid networking scenario of a plurality of high frequency base stations, the high frequency base station may be a high frequency micro base station, or may be a high frequency macro base station.

As shown in FIG. 11A, different from Embodiment 1, because uplink reference signals are not contiguous on time domain resources, NoMT intervals used for transmitting the uplink reference signals are also in a distributed manner, and the NoMT intervals are divided into NoMT segments.

In FIG. 11B, a frame length of one radio frame is 10 milliseconds. The radio frame includes 10 radio subframes with a frame length of 1 millisecond, and one radio subframe is further divided into eight timeslots with a length of 0.125 millisecond. Each timeslot includes Q symbols, and the symbol may be a single carrier symbol, or may be a multicarrier symbol such as an OFDM symbol. A typical value of Q may be set to 7n, where n is a positive integer. These timeslots are further classified into uplink timeslots and downlink timeslots.

The NoMT segment in the present application is placed in an uplink timeslot of a subframe, and may be placed at a header of the uplink timeslot or at a tail of the uplink timeslot. For example, in FIG. 11B, the NoMT segment is placed at a tail of an eighth timeslot (the timeslot is an uplink timeslot) of a second subframe.

Embodiment 3

Figure 12:
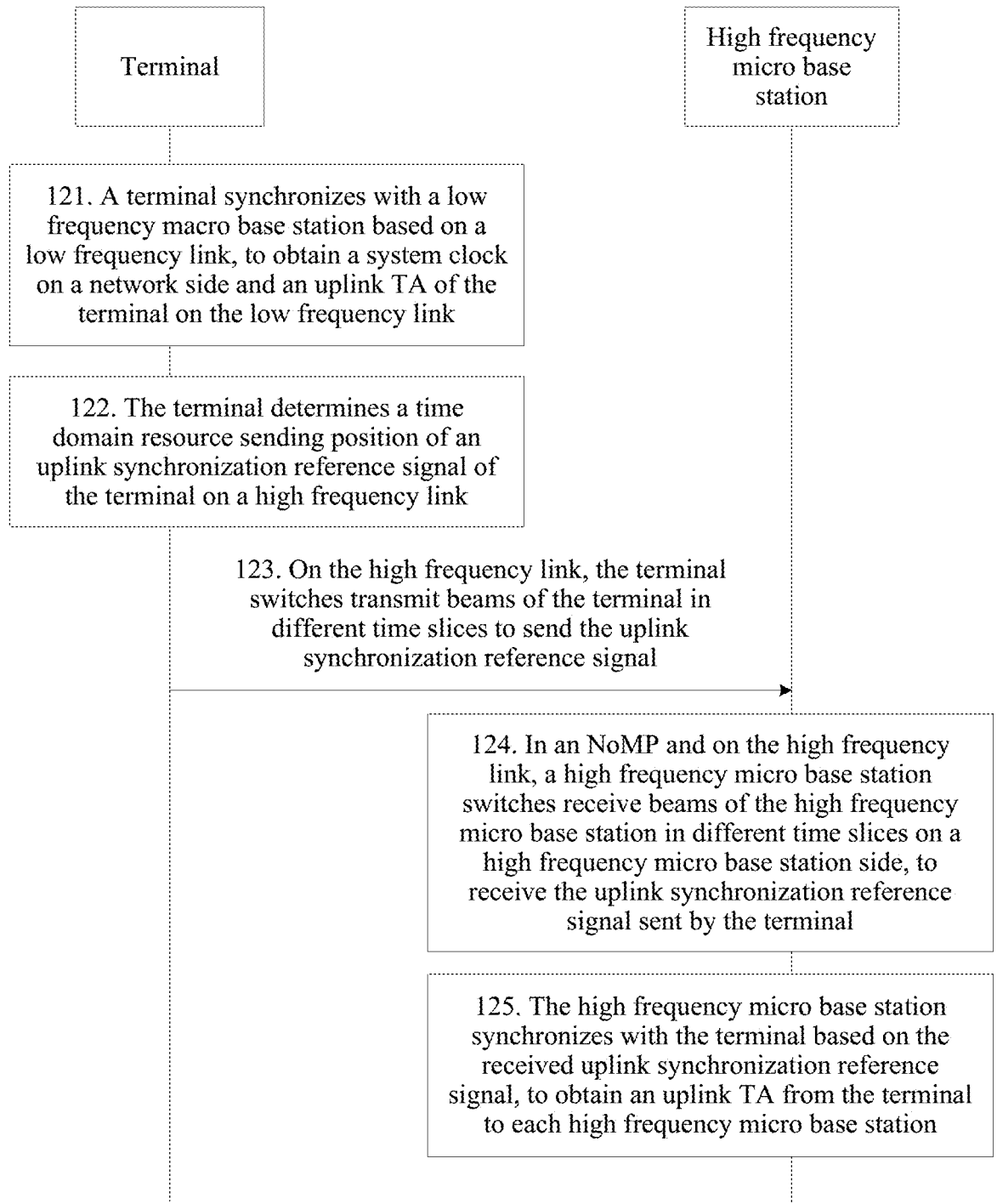
FIG. 12 is a schematic flowchart of an uplink synchronization reference signal transmission method according to Embodiment 3 of the present application.

Based on the frame structures provided in Embodiment 1 and Embodiment 2, Embodiment 3 provides an uplink synchronization reference signal transmission method, and the method is applied to a network deployment scenario shown in FIG. 2. As shown in FIG. 12, specific steps are as follows.

Step 121: A terminal synchronizes with a low frequency macro base station based on a low frequency link, to obtain a system clock on a network side and an uplink TA of the terminal on the low frequency link.

Step 122: The terminal determines a time domain resource sending position of an uplink synchronization reference signal of the terminal on a high frequency link.

In a method for determining the time domain resource sending position, the system clock obtained on the low frequency link and/or an uplink TA value obtained by the terminal on the low frequency link may be used, and a start point of a specific timeslot of the low frequency link may be used as the time domain resource sending position of the uplink reference signal on the high frequency link, namely, a time domain position of a start point of an NoMT.

Step 123: Based on the frame structure provided in Embodiment 1 or Embodiment 2, on the high frequency link, the terminal switches transmit beams of the terminal in different time slices to send the uplink synchronization reference signal, and may also carry an identity of the terminal.

Specifically, at a time interval corresponding to a synchronization reference signal in a first NoMT, the terminal sequentially switches the transmit beams in a first sequence to send the uplink synchronization reference signal, and at a time interval corresponding to a synchronization reference signal in a second NoMT, the terminal sequentially switches the transmit beams in a second sequence to send the uplink synchronization reference signal. The second sequence is a cyclic shift of the first sequence.

Step 124: In an NoMT and on the high frequency link, each high frequency micro base station on the network side switches receive beams of the high frequency micro base station in different time slices on a high frequency micro base station side, to receive the uplink synchronization reference signal sent by the terminal, where a length of the time slice on the high frequency micro base station side is less than a length of a time slice on a terminal side.

Step 125: Each high frequency micro base station on the network side synchronizes with the terminal based on the received uplink synchronization reference signal, to obtain an uplink TA from the terminal to each high frequency micro base station.

Embodiment 4

Figure 13:
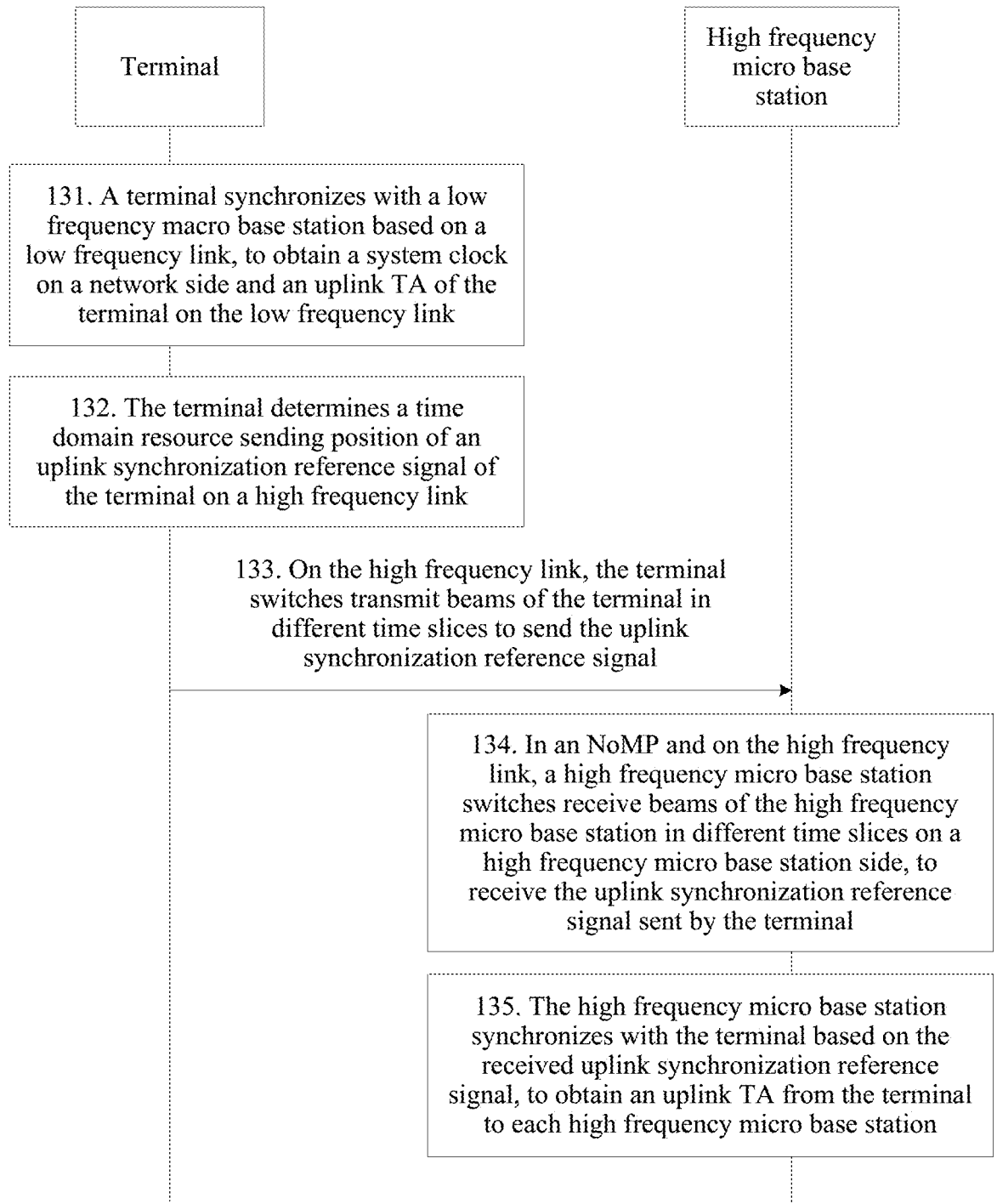
FIG. 13 is a schematic flowchart of an uplink synchronization reference signal transmission method according to Embodiment 4 of the present application.

Based on the frame structures provided in Embodiment 1 and Embodiment 2, Embodiment 4 provides an uplink synchronization reference signal transmission method, and the method is applied to a network deployment scenario shown in FIG. 2. As shown in FIG. 13, specific steps are as follows.

Step 131: A terminal synchronizes with a low frequency macro base station based on a low frequency link, to obtain a system clock on a network side and an uplink TA of the terminal on the low frequency link.

Step 132: The terminal determines a time domain resource sending position of an uplink synchronization reference signal of the terminal on a high frequency link.

In a method for determining the time domain resource sending position, the system clock obtained on the low frequency link and/or an uplink TA value obtained by the terminal on the low frequency link may be used, and a start point of a specific timeslot of the low frequency link may be used as the time domain resource sending position of the uplink reference signal on the high frequency link, namely, a time domain position of a start point of an NoMT.

Step 133: Based on the frame structure provided in Embodiment 1 or Embodiment 2, on the high frequency link, the terminal switches transmit beams of the terminal in different time slices to send the uplink synchronization reference signal, and may also carry an identity of the terminal.

Step 134: In an NoMT and on the high frequency link, each high frequency micro base station on the network side switches receive beams of the high frequency micro base station in different time slices on a high frequency micro base station side, to receive the uplink synchronization reference signal sent by the terminal, where a length of the time slice on the high frequency micro base station side is less than a length of a time slice on a terminal side.

Specifically, at a time interval corresponding to a synchronization reference signal in a first NoMT, in duration in which the terminal sends a beam once, the high frequency micro base station sequentially switches the receive beams in a first sequence, to receive the uplink synchronization reference signal of the terminal, and at a time interval corresponding to a synchronization reference signal in a second NoMT, in the duration in which the terminal sends a beam once, the high frequency micro base station sequentially switches the receive beams in a second sequence, to receive the uplink synchronization reference signal of the terminal. The second sequence is a cyclic shift of the first sequence.

Step 135: Each high frequency micro base station on the network side synchronizes with the terminal based on the received uplink synchronization reference signal, to obtain an uplink TA from the terminal to each high frequency micro base station.

Embodiment 5

Figure 14:
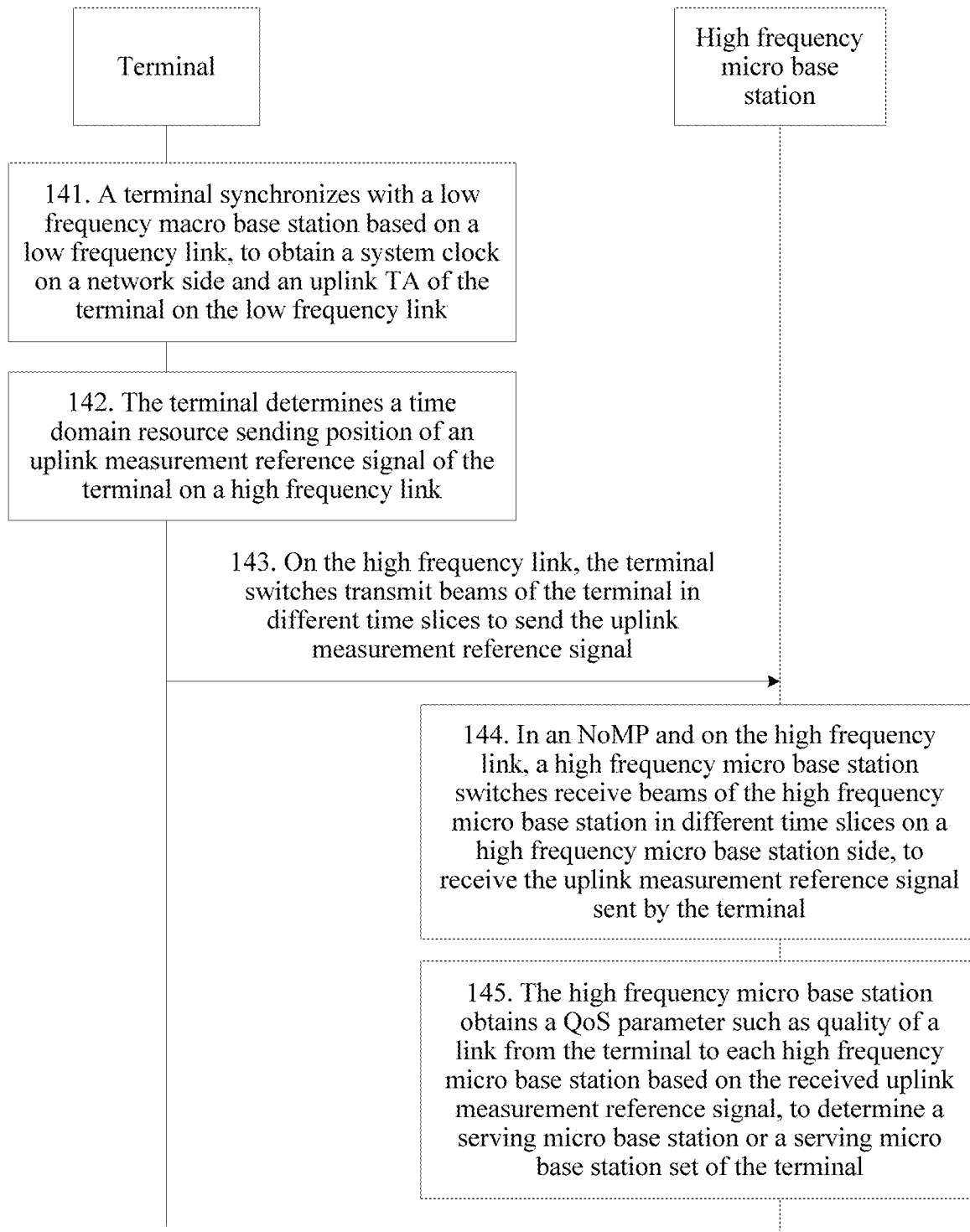
FIG. 14 is a schematic flowchart of an uplink measurement reference signal transmission method according to Embodiment 5 of the present application.

Based on the frame structures provided in Embodiment 1 and Embodiment 2, Embodiment 5 provides an uplink measurement reference signal transmission method, and the method is applied to a network deployment scenario shown in FIG. 2. As shown in FIG. 14, specific steps are as follows.

Step 141: A terminal synchronizes with a low frequency macro base station based on a low frequency link, to obtain a system clock on a network side and an uplink TA of the terminal on the low frequency link.

Step 142: The terminal determines a time domain resource sending position of an uplink measurement reference signal of the terminal on a high frequency link.

In a method for determining the time domain resource sending position, the system clock obtained on the low frequency link and/or an uplink TA value obtained by the terminal on the low frequency link may be used, and a start point of a specific timeslot of the low frequency link may be used as the time domain resource sending position of the uplink reference signal on the high frequency link, namely, a time domain position of a start point of an NoMT.

Step 143: Based on the frame structure provided in Embodiment 1 or Embodiment 2, on the high frequency link, the terminal switches transmit beams of the terminal in different time slices to send the uplink measurement reference signal, and may also carry an identity of the terminal.

Specifically, at a time interval corresponding to a measurement reference signal in a first NoMT, the terminal sequentially switches the transmit beams in a first sequence, to send the uplink measurement reference signal, and at a time interval corresponding to a measurement reference signal in a second NoMT, the terminal sequentially switches the transmit beams in a second sequence, to send the uplink measurement reference signal. The second sequence is a cyclic shift of the first sequence.

Step 144: In an NoMT and on the high frequency link, each high frequency micro base station on the network side switches receive beams of the high frequency micro base station in different time slices on a high frequency micro base station side, to receive the uplink measurement reference signal sent by the terminal, where a length of the time slice on the high frequency micro base station side is less than a length of a time slice on a terminal side.

Step 145: Each high frequency micro base station on the network side obtains a QoS parameter such as quality of a link from the terminal to each high frequency micro base station based on the received uplink measurement reference signal, to determine a serving micro base station or a serving micro base station set of the terminal.

It should be noted that main steps in Embodiment 5 are the same as those in Embodiment 3. A main difference is that a reference signal carried by an uplink signal of the terminal is a measurement reference signal instead of a synchronization reference signal. During final system design, the two types of reference signals may be combined. In other words, a group of reference signals are used for both synchronization and measurement.

Embodiment 6

Figure 15:
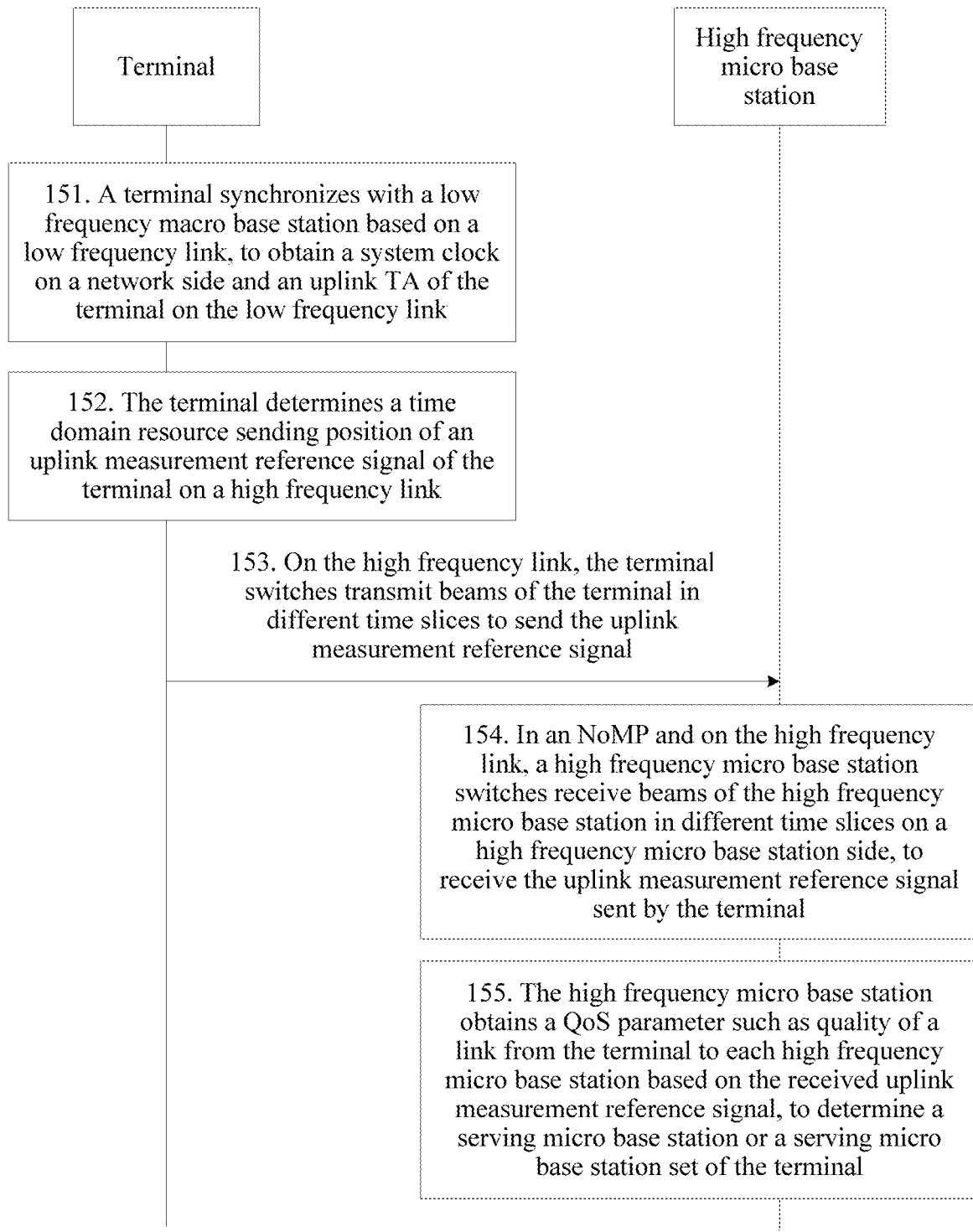
FIG. 15 is a schematic flowchart of an uplink measurement reference signal transmission method according to Embodiment 6 of the present application.

Based on the frame structures provided in Embodiment 1 and Embodiment 2, Embodiment 6 provides an uplink measurement reference signal transmission method, and the method is applied to a network deployment scenario shown in FIG. 2. As shown in FIG. 15, specific steps are as follows.

Step 151: A terminal synchronizes with a low frequency macro base station based on a low frequency link, to obtain a system clock on a network side and an uplink TA of the terminal on the low frequency link.

Step 152: The terminal determines a time domain resource sending position of an uplink measurement reference signal of the terminal on a high frequency link.

In a method for determining the time domain resource sending position, the system clock obtained on the low frequency link and/or an uplink TA value obtained by the terminal on the low frequency link may be used, and a start point of a specific timeslot of the low frequency link may be used as the time domain resource sending position of the uplink reference signal on the high frequency link, namely, a time domain position of a start point of an NoMT.

Step 153: Based on the frame structure provided in Embodiment 1 or Embodiment 2, on the high frequency link, the terminal switches transmit beams of the terminal in different time slices to send the uplink measurement reference signal, and may also carry an identity of the terminal.

Step 154: In an NoMT and on the high frequency link, each high frequency micro base station on the network side switches receive beams of the high frequency micro base station in different time slices on a high frequency micro base station side, to receive the uplink measurement reference signal sent by the terminal, where a length of the time slice on the high frequency micro base station side is less than a length of a time slice on a terminal side.

Specifically, at a time interval corresponding to a measurement reference signal in a first NoMT, in duration in which the terminal sends a beam once, the high frequency micro base station sequentially switches the receive beams in a first sequence, to receive the uplink measurement reference signal of the terminal, and at a time interval corresponding to a measurement reference signal in a second NoMT, in the duration in which the terminal sends a beam once, the high frequency micro base station sequentially switches the receive beams in a second sequence, to receive the uplink measurement reference signal of the terminal. The second sequence is a cyclic shift of the first sequence.

Step 155: Each high frequency micro base station on the network side obtains a QoS parameter such as quality of a link from the terminal to each high frequency micro base station based on the received uplink measurement reference signal, to determine a serving micro base station or a serving micro base station set of the terminal.

It should be noted that main steps in Embodiment 6 are the same as those in Embodiment 4. A main difference is that a reference signal carried by an uplink signal of the terminal is a measurement reference signal instead of a synchronization reference signal. During final system design, the two types of reference signals may be combined. In other words, a group of reference signals are used for both synchronization and measurement.

Embodiment 7

Figure 16:
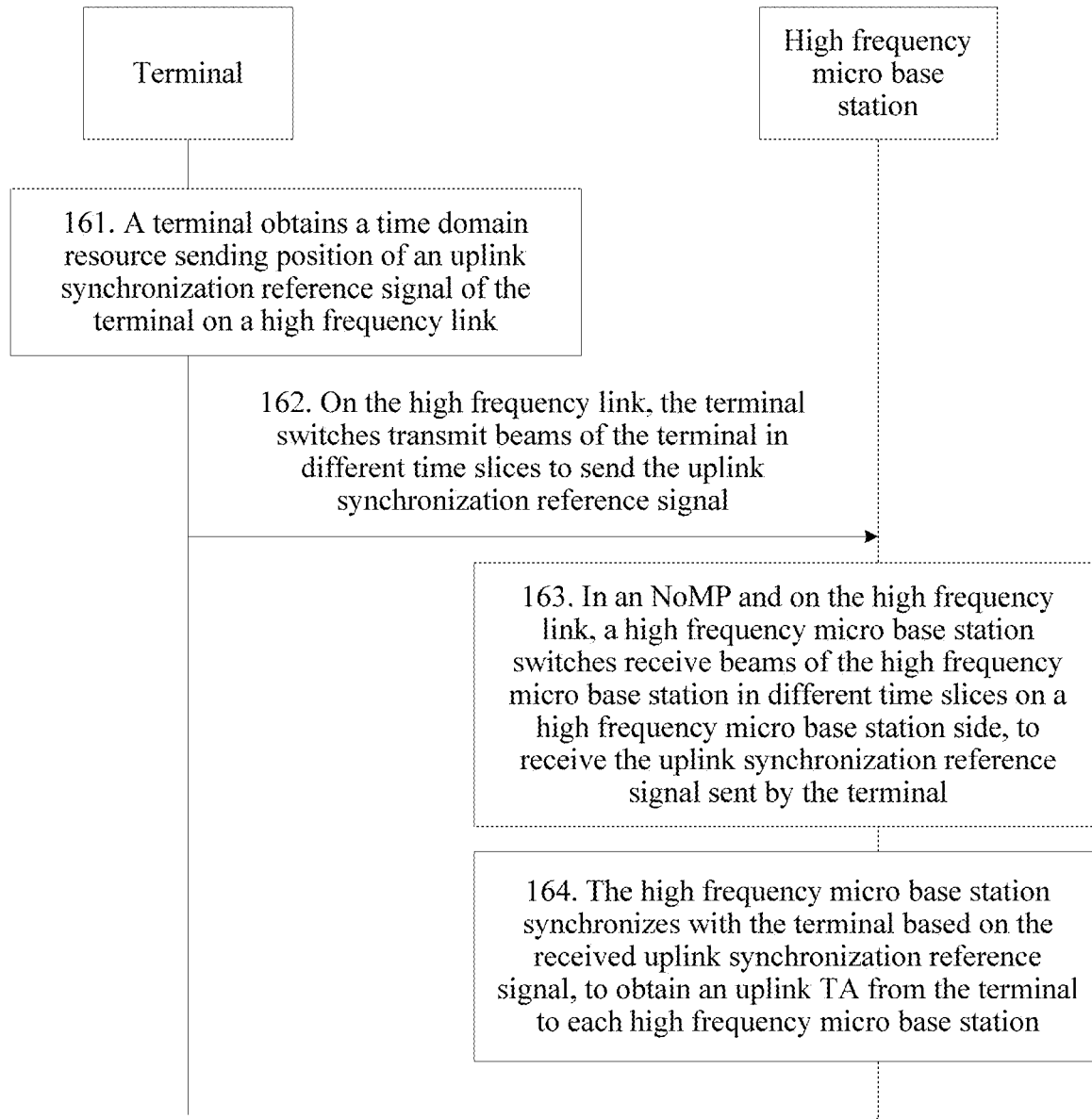
FIG. 16 is a schematic flowchart of an uplink synchronization reference signal transmission method according to Embodiment 7 of the present application.

Based on the schematic diagram of the application scenario shown in FIG. 9, an embodiment of the present application provides an uplink synchronization reference signal transmission method. As shown in FIG. 16, a specific procedure includes the following steps.

Step 161: A terminal obtains a time domain resource sending position of an uplink synchronization reference signal of the terminal on a high frequency link. Specifically, a method for obtaining the time domain resource sending position of the uplink synchronization reference signal may be: A neighboring high frequency micro base station notifies, through broadcasting, the terminal of a system clock used by the high frequency micro base station, and the terminal determines the time domain resource sending position of the uplink reference signal of the terminal on the high frequency link through calculation based on the system clock, namely, a time domain position of a start point of an NoMT.

Step 162: Based on the frame structure provided in Embodiment 1 or Embodiment 2, on the high frequency link, the terminal switches transmit beams of the terminal in different time slices to send the uplink synchronization reference signal, and may also carry an identity of the terminal.

Specifically, at a time interval corresponding to a synchronization reference signal in a first NoMT, the terminal sequentially switches the transmit beams in a first sequence to send the uplink synchronization reference signal, and at a time interval corresponding to a synchronization reference signal in a second NoMT, the terminal sequentially switches the transmit beams in a second sequence to send the uplink synchronization reference signal. The second sequence is a cyclic shift of the first sequence.

Step 163: In an NoMT and on the high frequency link, each high frequency micro base station on a network side switches receive beams of the high frequency micro base station in different time slices on a high frequency micro base station side, to receive the uplink synchronization reference signal sent by the terminal.

A length of the time slice on the high frequency micro base station side is less than a length of a time slice on a terminal side.

Step 164: Each high frequency micro base station on the network side synchronizes with the terminal based on the received uplink synchronization reference signal, to obtain an uplink TA from the terminal to each high frequency micro base station.

Embodiment 8

Figure 17:
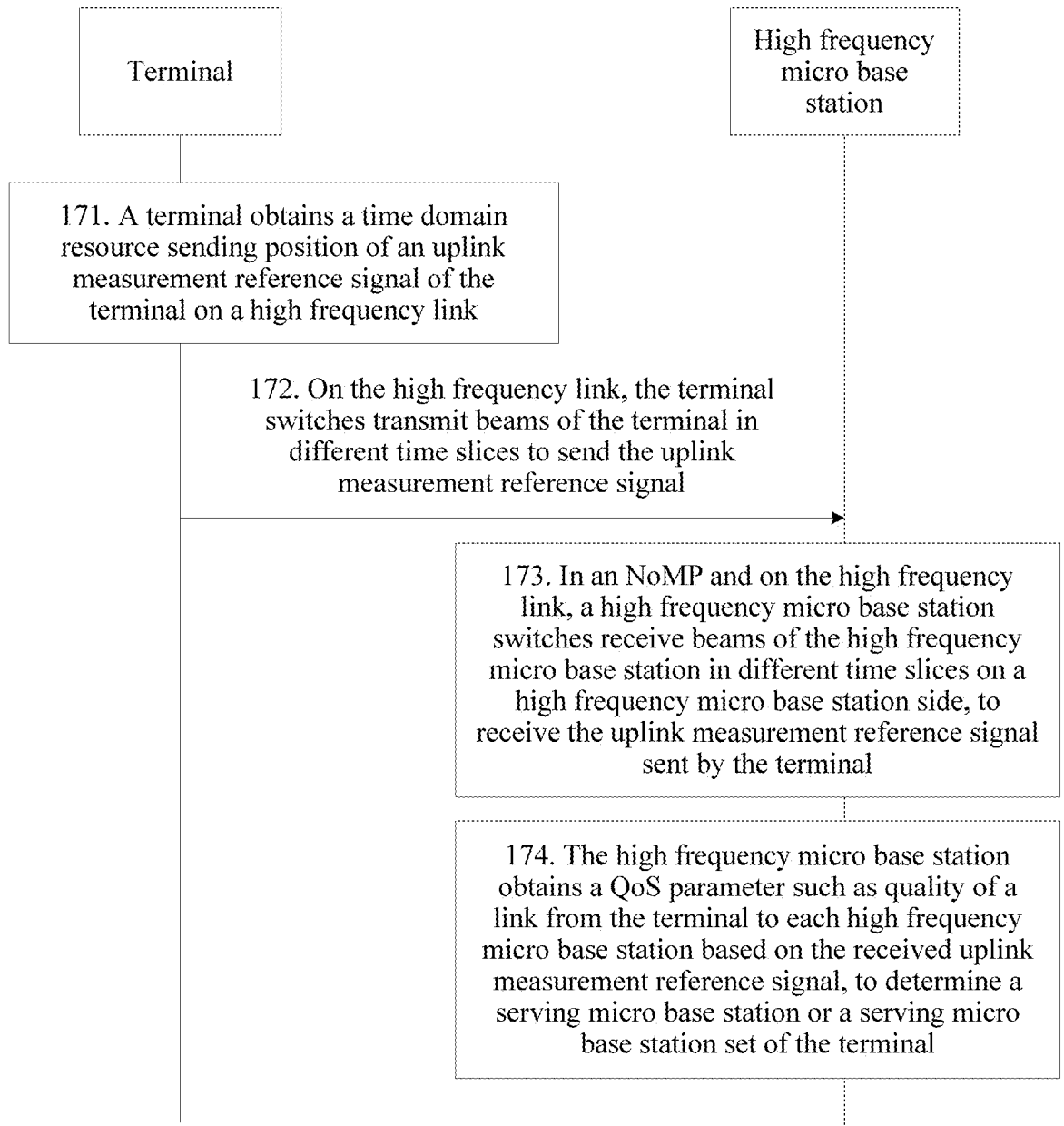
FIG. 17 is a schematic flowchart of an uplink synchronization reference signal transmission method according to Embodiment 8 of the present application.

Based on the schematic diagram of the application scenario shown in FIG. 9, an embodiment of the present application provides an uplink measurement reference signal transmission method. As shown in FIG. 17, a specific procedure includes the following steps.

Step 171: A terminal obtains a time domain resource sending position of an uplink measurement reference signal of the terminal on a high frequency link. Specifically, a method for obtaining the time domain resource sending position of the uplink measurement reference signal may be: A neighboring high frequency micro base station notifies, through broadcasting, the terminal of a system clock used by the high frequency micro base station, and the terminal determines the time domain resource sending position of the uplink reference signal of the terminal on the high frequency link through calculation based on the system clock, namely, a time domain position of a start point of an NoMT.

Step 172: Based on the frame structure provided in Embodiment 1 or Embodiment 2, on the high frequency link, the terminal switches transmit beams of the terminal in different time slices to send the uplink measurement reference signal, and may also carry an identity of the terminal.

Specifically, at a time interval corresponding to a measurement reference signal in a first NoMT, the terminal sequentially switches the transmit beams in a first sequence, to send the uplink measurement reference signal, and at a time interval corresponding to a measurement reference signal in a second NoMT, the terminal sequentially switches the transmit beams in a second sequence, to send the uplink measurement reference signal. The second sequence is a cyclic shift of the first sequence.

Step 173: In an NoMT and on the high frequency link, each high frequency micro base station on a network side switches receive beams of the high frequency micro base station in different time slices on a high frequency micro base station side, to receive the uplink measurement reference signal sent by the terminal.

A length of the time slice on the high frequency micro base station side is less than a length of a time slice on a terminal side.

Step 174: Each high frequency micro base station on the network side obtains a QoS parameter such as quality of a link from the terminal to each high frequency micro base station based on the received uplink measurement reference signal, to determine a serving micro base station or a serving micro base station set of the terminal.

It should be noted that main steps in Embodiment 8 are the same as those in Embodiment 7. A main difference is that a reference signal carried by an uplink signal of the terminal is a measurement reference signal instead of a synchronization reference signal. During final system design, the two types of reference signals may be combined. In other words, a group of reference signals are used for both synchronization and measurement.

Embodiment 9

Figure 18:
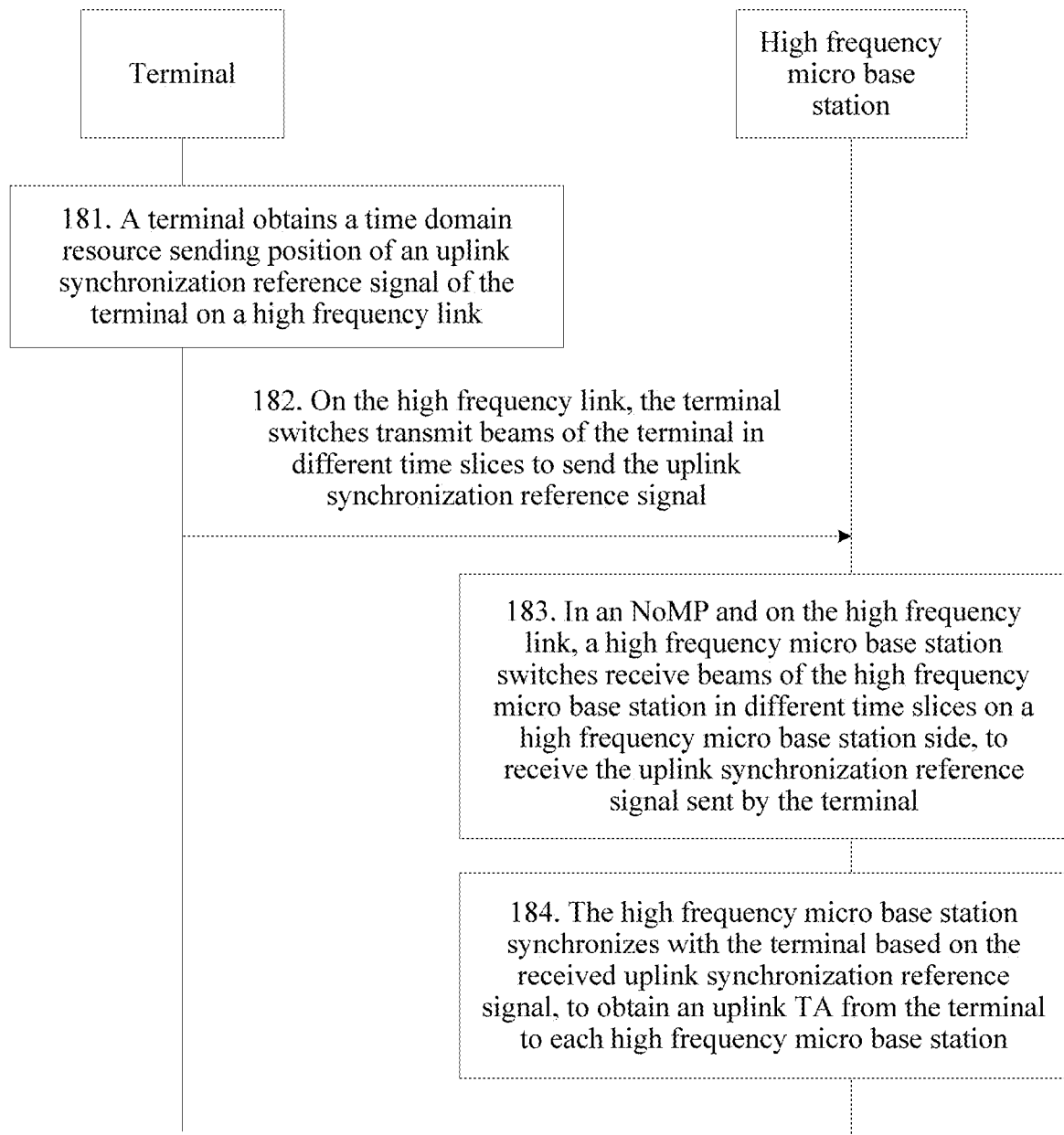
FIG. 18 is a schematic flowchart of an uplink measurement reference signal transmission method according to Embodiment 9 of the present application.

Based on the schematic diagram of the application scenario shown in FIG. 9, an embodiment of the present application provides an uplink synchronization reference signal transmission method. As shown in FIG. 18, a specific procedure includes the following steps.

Step 181: A terminal obtains a time domain resource sending position of an uplink synchronization reference signal of the terminal on a high frequency link. Specifically, a method for obtaining the time domain resource sending position of the uplink synchronization reference signal may be: A neighboring high frequency micro base station notifies, through broadcasting, the terminal of a system clock used by the high frequency micro base station, and the terminal determines the time domain resource sending position of the uplink reference signal of the terminal on the high frequency link through calculation based on the system clock, namely, a time domain position of a start point of an NoMT.

Step 182: Based on the frame structure provided in Embodiment 1 or Embodiment 2, on the high frequency link, the terminal switches transmit beams of the terminal in different time slices to send the uplink synchronization reference signal, and may also carry an identity of the terminal.

Step 183: In an NoMT and on the high frequency link, each high frequency micro base station on a network side switches receive beams of the high frequency micro base station in different time slices on a high frequency micro base station side, to receive the uplink synchronization reference signal sent by the terminal.

Specifically, at a time interval corresponding to a synchronization reference signal in a first NoMT, in duration in which the terminal sends a beam once, the high frequency micro base station sequentially switches the receive beams in a first sequence, to receive the uplink synchronization reference signal of the terminal, and at a time interval corresponding to a synchronization reference signal in a second NoMT, in the duration in which the terminal sends a beam once, the high frequency micro base station sequentially switches the receive beams in a second sequence, to receive the uplink synchronization reference signal of the terminal. The second sequence is a cyclic shift of the first sequence.

A length of the time slice on the high frequency micro base station side is less than a length of a time slice on a terminal side.

Step 184: Each high frequency micro base station on the network side synchronizes with the terminal based on the received uplink synchronization reference signal, to obtain an uplink TA from the terminal to each high frequency micro base station.

Embodiment 10

Figure 19:
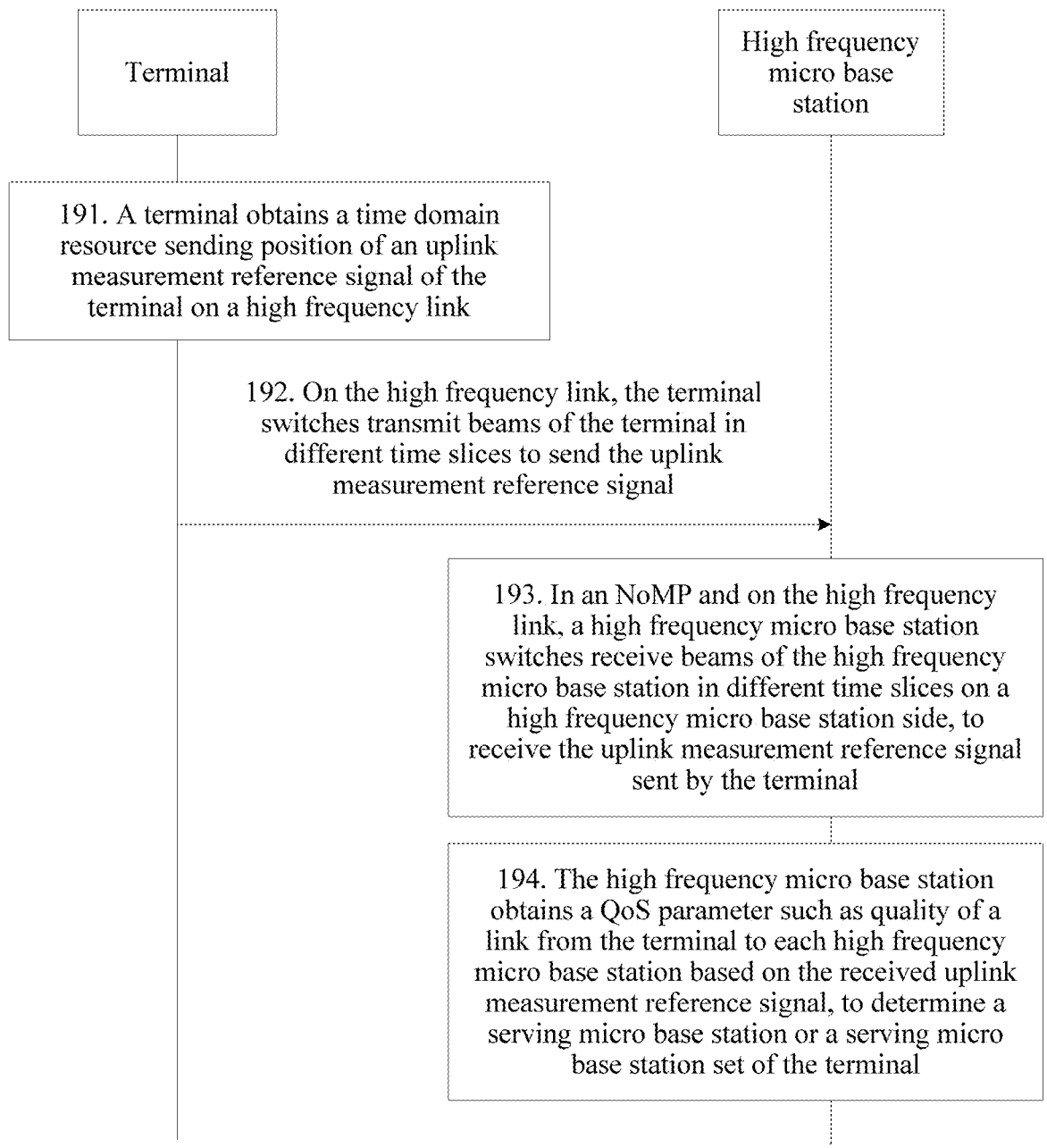
FIG. 19 is a schematic flowchart of an uplink measurement reference signal transmission method according to Embodiment 10 of the present application.

Based on the schematic diagram of the application scenario shown in FIG. 9, an embodiment of the present application provides an uplink measurement reference signal transmission method. As shown in FIG. 19, a specific procedure includes the following steps.

Step 191: A terminal obtains a time domain resource sending position of an uplink measurement reference signal of the terminal on a high frequency link. Specifically, a method for obtaining the time domain resource sending position of the uplink measurement reference signal may be: A neighboring high frequency micro base station notifies, through broadcasting, the terminal of a system clock used by the high frequency micro base station, and the terminal determines the time domain resource sending position of the uplink reference signal of the terminal on the high frequency link through calculation based on the system clock, namely, a time domain position of a start point of an NoMT.

Step 192: Based on the frame structure provided in Embodiment 1 or Embodiment 2, on the high frequency link, the terminal switches transmit beams of the terminal in different time slices to send the uplink measurement reference signal, and may also carry an identity of the terminal.

Step 193: In an NoMT and on the high frequency link, each high frequency micro base station on a network side switches receive beams of the high frequency micro base station in different time slices on a high frequency micro base station side, to receive the uplink measurement reference signal sent by the terminal.

A length of the time slice on the high frequency micro base station side is less than a length of a time slice on a terminal side.

Specifically, at a time interval corresponding to a measurement reference signal in a first NoMT, in duration in which the terminal sends a beam once, the high frequency micro base station sequentially switches the receive beams in a first sequence, to receive the uplink measurement reference signal of the terminal, and at a time interval corresponding to a measurement reference signal in a second NoMT, in the duration in which the terminal sends a beam once, the high frequency micro base station sequentially switches the receive beams in a second sequence, to receive the uplink measurement reference signal of the terminal. The second sequence is a cyclic shift of the first sequence.

Step 194: Each high frequency micro base station on the network side obtains a QoS parameter such as quality of a link from the terminal to each high frequency micro base station based on the received uplink measurement reference signal, to determine a serving micro base station or a serving micro base station set of the terminal.

It should be noted that main steps in Embodiment 10 are the same as those in Embodiment 9. A main difference is that a reference signal carried by an uplink signal of the terminal is a measurement reference signal instead of a synchronization reference signal. During final system design, the two types of reference signals may be combined. In other words, a group of reference signals are used for both synchronization and measurement.

Figure 20:
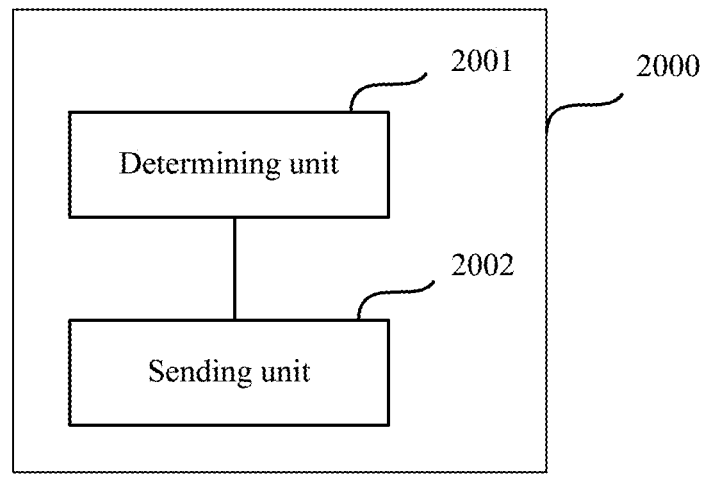
FIG. 20 is a structural diagram of an uplink reference signal transmission apparatus according to an embodiment of the present application.

Based on the foregoing embodiments, as shown in FIG. 20, FIG. 20 is a schematic structural diagram of an uplink reference signal transmission apparatus 2000 according to an embodiment of the present application. The apparatus 2000 is applied to a terminal in a HetNet scenario in which a high frequency base station is a micro base station and a low frequency base station is a macro base station or a terminal in a networking scenario of only high frequency base stations, and may be configured to perform an execution process of the terminal in the foregoing method embodiments. The apparatus 2000 includes a determining unit 2001 and a sending unit 2002.

The determining unit 2001 is configured to determine a time domain resource sending position of an uplink reference signal of a terminal on a high frequency link, where there is a guard interval at at least one end of the uplink reference signal.

The sending unit 2002 is configured to: after arriving at the time domain resource sending position, switch, in a first sequence, transmit beams in different time slices in M time slices at a first time interval corresponding to the uplink reference signal, to transmit the uplink reference signal, and switch, in a second sequence, transmit beams in different time slices in the M time slices at a second time interval corresponding to the uplink reference signal, to transmit the uplink reference signal, where the uplink reference signal includes uplink reference signals transmitted in the M different time slices, M is a positive integer greater than 1, and the second sequence is a cyclic shift of the first sequence.

Optionally, the first time interval corresponding to the uplink reference signal falls within an odd-numbered transmission time interval of uplink measurement at which the uplink reference signal is located, and the second time interval corresponding to the uplink reference signal falls within an even-numbered transmission time interval of uplink measurement at which the uplink reference signal is located.

Optionally, the guard interval is duration in which the terminal does not transmit a signal.

Optionally, the uplink reference signal includes a synchronization reference signal and/or an uplink measurement reference signal.

Optionally, the uplink measurement reference signal includes a sounding reference signal.

Optionally, a length of the guard interval is not less than a half of an uplink timing advance from the terminal to any high frequency base station.

Optionally, when determining the time domain resource sending position of the uplink reference signal of the terminal on the high frequency link, the determining unit 2001 is specifically configured to: obtain a system clock of a low frequency base station based on a low frequency link, and determine a start point position, indicated by the system clock, of a timeslot of the low frequency link as the time domain resource sending position of the uplink reference signal of the terminal on the high frequency link; or obtain a system clock of a low frequency base station and an uplink timing advance of the terminal on a low frequency link based on the low frequency link, and determine, as the time domain resource sending position of the uplink reference signal of the terminal on the high frequency link, a position that is the uplink timing advance after a start point, indicated by the system clock, of a timeslot of the low frequency link; or receive indication information of the time domain resource sending position that is sent by a network side.

Optionally, when transmitting the uplink reference signal, the sending unit 2002 is specifically configured to: generate a radio frame, where the radio frame includes at least one network-oriented measurement timeslot interval, and the network-oriented measurement timeslot interval includes the guard interval and a symbol used for uplink reference signal transmission; and send the radio frame to transmit the uplink reference signal.

The apparatus 2000 in this embodiment of the present application may be an independent component, or may be integrated into another component. For example, the apparatus 2000 provided in this embodiment of the present application may be a terminal in an existing communications network, or may be a component integrated into a terminal.

It should be noted that, for function implementation and an interaction manner of the units of the apparatus 2000 in this embodiment of the present application, further refer to descriptions in a related method embodiment. Details are not described herein again.

In addition, each foregoing "unit" may be implemented using an application-specific integrated circuit (ASIC), a processor and a memory that execute one or more software or firmware programs, an integrated logic circuit, and/or another device that can provide the foregoing functions.

Figure 21:
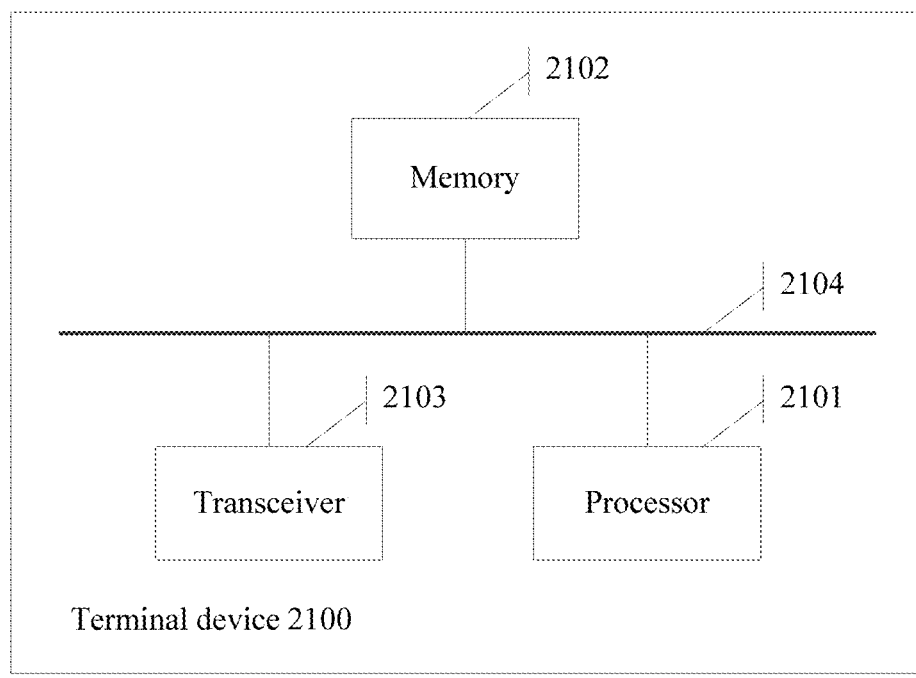
FIG. 21 is a structural diagram of a terminal device according to an embodiment of the present application.

Based on a same concept, as shown in FIG. 21, FIG. 21 is a schematic structural diagram of a terminal device 2100 according to an embodiment of the present application. The terminal device 2100 may be configured to perform an execution process of the terminal in the foregoing method embodiments. The terminal device 2100 may be a wireless terminal. The wireless terminal may be a device that provides voice and/or data connectivity for a user, a handheld device with a wireless connection function, or another processing device connected to a wireless modem. The wireless terminal may communicate with one or more core networks using a radio access network (RAN). The wireless terminal may be a mobile terminal, such as a mobile phone (or referred to as a "cellular" phone) or a computer with a mobile terminal. For example, the wireless terminal may be a portable, pocket-sized, handheld, or a computer built-in mobile apparatus, or an in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile terminal, a remote station, an access point (AP), a remote terminal, an access terminal, a user terminal, a user agent, a user device, or user equipment (UE). The present application imposes no limitation thereto. For example, the terminal further includes a wired-access terminal with a multi-carrier feature.

Referring to FIG. 21, the terminal device 2100 includes a processor 2101, a memory 2102, and a transceiver 2103.

The processor 2101, the memory 2102, and the transceiver 2103 are connected to each other using a bus 2104.

The transceiver 2103 may implement a function using a receiver and a transmitter, and the transceiver 2103 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof.

The processor 2101 is configured to invoke a program stored in the memory 2102 to perform the following steps: determining a time domain resource sending position of an uplink reference signal of a terminal on a high frequency link, where there is a guard interval at at least one end of the uplink reference signal; and after arriving at the time domain resource sending position, switching, in a first sequence, transmit beams in different time slices in M time slices at a first time interval corresponding to the uplink reference signal, to transmit the uplink reference signal using the transceiver 2103, and switching, in a second sequence, transmit beams in different time slices in the M time slices at a second time interval corresponding to the uplink reference signal, to transmit the uplink reference signal using the transceiver 2103, where the uplink reference signal includes uplink reference signals transmitted in the M different time slices, and the second sequence is a cyclic shift of the first sequence.

The processor 2101 may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content of the terminal disclosed in the present application. The processor may also be a combination for implementing computing functions, for example, a combination of one or more microprocessors and a combination of a DSP and a microprocessor.

The memory 2102 may include a volatile memory such as a RAM; or the memory 2102 may include a nonvolatile memory such as a ROM, a flash memory, an HDD, or an SSD; or the memory 2102 may include a combination of the foregoing memories. Optionally, the memory 2102 stores voice indication information corresponding to a network frequency channel number.

The memory 2102 may be configured to store a message, data, and a storage instruction that are received by the transceiver 2103.

The processor 2101 invokes the instruction stored in the memory 2102 to perform method steps in the method embodiments of the present application, so as to implement the technical solutions in the method embodiments of the present application.

In FIG. 21, the bus 2104 may include any quantity of interconnected buses and bridges, and specifically interconnects various circuits of one or more processors represented by the processor 2101 and a memory represented by the memory 2102. The bus 2104 may be a peripheral component interconnect (PCI) bus, an extended industry standard architecture (EISA) bus, or the like. The bus may be classified into an address bus, a data bus, a control bus, and the like. For ease of representation, the bus is represented using a thick line in FIG. 21. However, it does not indicate that there is only one bus or only one type of bus. The bus 2104 may further interconnect various other circuits such as a peripheral device, a voltage regulator, and a power management circuit. These are all well known in the art, and therefore are not further described in this specification.

For a problem-resolving implementation and beneficial effects of the terminal device, refer to the implementations and the beneficial effects of the method embodiments of the present application. Therefore, for implementation of the terminal device, refer to the implementation of the method. Repeated parts are not described.

Figure 22:
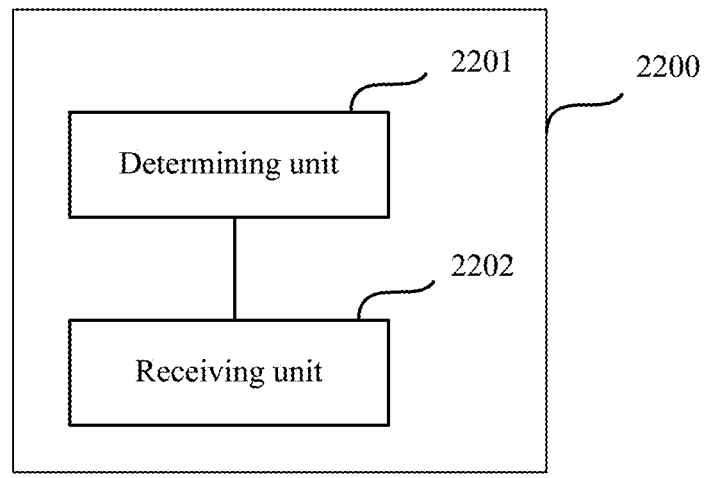
FIG. 22 is a structural diagram of an uplink reference signal transmission apparatus according to an embodiment of the present application.

Based on the foregoing embodiments, as shown in FIG. 22, FIG. 22 is a schematic structural diagram of an uplink reference signal transmission apparatus 2200 according to an embodiment of the present application. The apparatus 2200 is applied to a high frequency micro base station in a HetNet scenario in which a high frequency base station is a micro base station and a low frequency base station is a macro base station or a high frequency base station in a networking scenario of only high frequency base stations, and may be configured to perform an execution process of the high frequency micro base station or the high frequency base station in the foregoing method embodiments. The apparatus 2200 includes a determining unit 2201 and a receiving unit 2202.

The determining unit 2201 is configured to determine N time slices that are used to receive an uplink reference signal transmitted by a terminal in a single time slice of the terminal, where N is a positive integer greater than 1.

The receiving unit 2202 is configured to: switch, in a first sequence, receive beams in different time slices in the N time slices at a first time interval corresponding to the uplink reference signal, to receive the uplink reference signal transmitted by the terminal in the single time slice of the terminal, and switch, in a second sequence, receive beams in different time slices in the N time slices at a second time interval corresponding to the uplink reference signal, to receive the uplink reference signal transmitted by the terminal in the single time slice of the terminal, where there is a guard interval at at least one end of the uplink reference signal.

Optionally, the first time interval corresponding to the uplink reference signal falls within an odd-numbered transmission time interval of uplink measurement at which the uplink reference signal is located, and the second time interval corresponding to the uplink reference signal falls within an even-numbered transmission time interval of uplink measurement at which the uplink reference signal is located.

The apparatus 2200 in this embodiment of the present application may be an independent component, or may be integrated into another component. For example, the apparatus 2200 provided in this embodiment of the present application may be a base station in an existing communications network, or may be a component integrated into a base station.

It should be noted that, for function implementation and an interaction manner of the units of the apparatus 2200 in this embodiment of the present application, further refer to descriptions in a related method embodiment. Details are not described herein again.

In addition, each foregoing "unit" may be implemented using an application-specific integrated circuit (ASIC), a processor and a memory that execute one or more software or firmware programs, an integrated logic circuit, and/or another device that can provide the foregoing functions.

Figure 23:
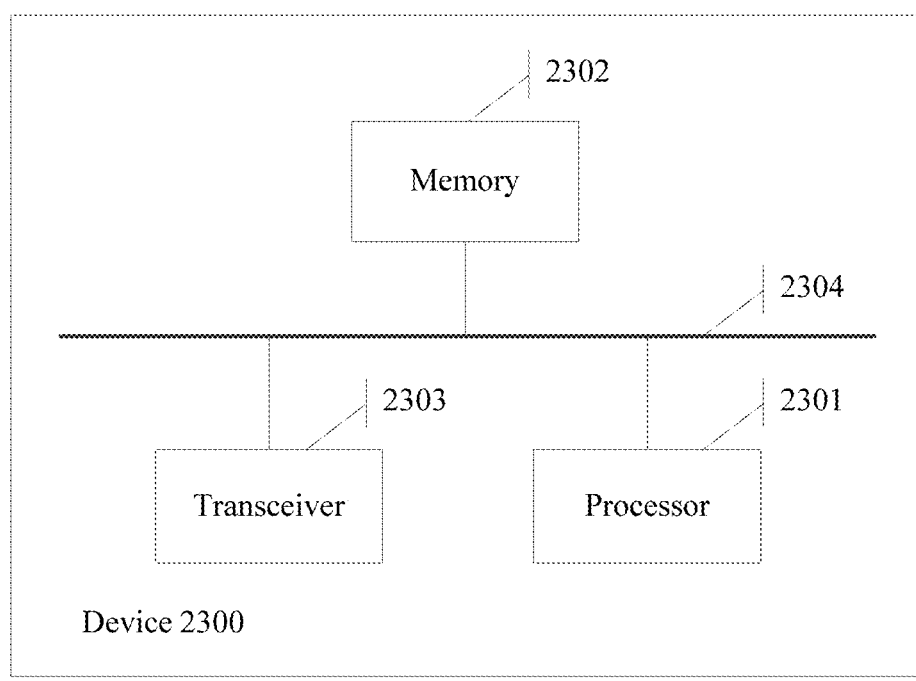
FIG. 23 is a structural diagram of a network side device according to an embodiment of the present application.

As shown in FIG. 23, FIG. 23 is a schematic structural diagram of a network side device 2300 according to an embodiment of the present application. The device 2300 may be configured to perform an execution process of the high frequency micro base station or the high frequency base station in the foregoing method embodiments. The device 2300 may include a base station, or a radio resource management device configured to control a base station.

Referring to FIG. 23, the device 2300 includes a processor 2301, a memory 2302, and a transceiver 2303.

The processor 2301, the memory 2302, and the transceiver 2303 are connected to each other using a bus 2304.

The transceiver 2303 may implement a function using a receiver and a transmitter, and the transceiver 2303 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof.

The processor 2301 may be a CPU, a general purpose processor, a DSP, an ASIC, an FPGA or another programmable logic device, a transistor logic device, a hardware component, or any combination thereof. The memory 2302 may include a volatile memory such as a RAM; the memory 2302 may include a nonvolatile memory such as a ROM, a flash memory, an HDD, or an SSD; or the memory 2302 may include a combination of the foregoing memories.

The memory 2302 may be configured to store a message received by the transceiver 2303 and a program to be executed by the processor 2301.

The processor 2301 is configured to invoke the program stored in the memory 2302 to perform the following steps: determining N time slices that are used to receive an uplink reference signal transmitted by a terminal in a single time slice of the terminal, where N is a positive integer greater than 1; and switching, in a first sequence, receive beams in different time slices in the N time slices at a first time interval corresponding to the uplink reference signal, to receive, using the transceiver 2303, the uplink reference signal transmitted by the terminal in the single time slice of the terminal, and switching, in a second sequence, receive beams in different time slices in the N time slices at a second time interval corresponding to the uplink reference signal, to receive, using the transceiver 2303, the uplink reference signal transmitted by the terminal in the single time slice of the terminal, where there is a guard interval at at least one end of the uplink reference signal.

In FIG. 23, the bus 2304 may include any quantity of interconnected buses and bridges, and specifically interconnects various circuits of one or more processors represented by the processor 2301 and a memory represented by the memory 2302. The bus 2304 may be a PCI bus, an EISA bus, or the like. The bus may be classified into an address bus, a data bus, a control bus, and the like. For ease of representation, the bus is represented using a thick line in FIG. 23. However, it does not indicate that there is only one bus or only one type of bus. The bus 2304 may further interconnect various other circuits such as a peripheral device, a voltage regulator, and a power management circuit. These are all well known in the art, and therefore are further not described in this specification.

In conclusion, in the embodiments of the present application, in a HetNet scenario in which a high frequency base station is a micro base station and a low frequency base station is a macro base station or in a networking scenario of only high frequency base stations, a terminal determines a time domain resource sending position of an uplink reference signal of the terminal on a high frequency link, where there is a guard interval at at least one end of the uplink reference signal; and after arriving at the time domain resource sending position, switches, in a first sequence, transmit beams in different time slices in M time slices at a first time interval corresponding to the uplink reference signal, to transmit the uplink reference signal, and switches, in a second sequence, transmit beams in different time slices in the M time slices at a second time interval corresponding to the uplink reference signal, to transmit the uplink reference signal, where the uplink reference signal includes uplink reference signals transmitted in the M different time slices, and the second sequence is a cyclic shift of the first sequence. In this way, the uplink reference signal can be accurately transmitted in a HetNet hybrid networking scenario, and a beam detection missing problem caused when an uplink reference signal sent using a transmit beam cannot be completely received can be overcome.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device, and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present application have been described, a person skilled in the art can make changes and modifications to these embodiments once they learn the basic inventive concept. Therefore, the following claims are intended to be construed as to cover the embodiments and all changes and modifications falling within the scope of the present application.

Obviously, a person skilled in the art can make various modifications and variations to the embodiments of the present application without departing from the scope of the embodiments of the present application. The present application is intended to cover these modifications and variations provided that they fall within the scope of protection defined by the following claims and their equivalent technologies.

What is claimed is:

1. A method, comprising:
   determining, by a terminal, a time domain resource sending position of an uplink reference signal of the terminal on a high frequency link, wherein a guard interval is located at a first end of the uplink reference signal; and
   after arriving at the time domain resource sending position, transmitting, by the terminal, the uplink reference signal a plurality of first times in a first interval and a plurality of second times in a second interval, wherein each of the first interval and the second interval are respectively divided into M time slices, wherein in the first interval the terminal sequentially switches a current transmit beam used to send the uplink reference signal according to a first sequence to use a different transmit beam of the terminal in each different time slice of the M time slices of the first interval, and in the second interval the terminal sequentially switches the current transmit beam used to send the uplink reference signal according to a second sequence to use a different transmit beam of the terminal in each different time slice of the M time slices of the second interval, wherein M is a positive integer greater than 1, and the second sequence is a cyclic shift of the first sequence.

2. The method according to claim 1, wherein the first interval falls within an odd-numbered transmission time interval of uplink measurement, and the second interval falls within an even-numbered transmission time interval of uplink measurement.

3. The method according to claim 1, wherein the guard interval is duration in which the terminal does not transmit any signal.

4. The method according to claim 1, wherein the uplink reference signal comprises a synchronization reference signal or an uplink measurement reference signal.

5. The method according to claim 4, wherein the uplink measurement reference signal comprises a sounding reference signal.

6. The method according to claim 1, wherein a length of the guard interval is not less than a half of a length of an uplink timing advance from the terminal to any high frequency base station within range of the terminal.

7. The method according to claim 1, wherein determining, by the terminal, the time domain resource sending position of the uplink reference signal of the terminal on the high frequency link comprises:
   obtaining, by the terminal, a system clock of a low frequency base station based on a low frequency link, and determining a start point position, indicated by the system clock, of a timeslot of the low frequency link as the time domain resource sending position of the uplink reference signal of the terminal on the high frequency link;
   obtaining, by the terminal, a system clock of a low frequency base station and an uplink timing advance of the terminal on a low frequency link based on the low frequency link, and determining, as the time domain resource sending position of the uplink reference signal of the terminal on the high frequency link, a position that is a first time after a start point, indicated by the system clock, of a timeslot of the low frequency link, wherein the first time is equal to the uplink timing advance; or
   receiving, by the terminal from a network side device, indication information of the time domain resource sending position.

8. The method according to claim 1, wherein transmitting, by the terminal, the uplink reference signal the plurality of first times in the first interval comprises:
   generating a radio frame, wherein the radio frame comprises a network-oriented measurement timeslot interval, and the network-oriented measurement timeslot interval comprises the guard interval and a symbol used for uplink reference signal transmission; and
   sending the radio frame to transmit the uplink reference signal.

9. A method, comprising:
   determining, by a high frequency base station, N time slices in a first interval for receiving an uplink reference signal a first time and N time slices in a second interval for receiving the uplink reference signal a second time, wherein N is a positive integer greater than 1; and receiving the uplink reference signal the first time in the first interval and the second time in the second interval, wherein in the first interval the high frequency base station sequentially switches a current receive beam used to receive the uplink reference signal according to a first sequence to use a different receive beam of the high frequency base station in each different time slice of the N time slices of the first interval, and wherein in the second interval the high frequency base station sequentially switches the current receive beam used to receive the uplink reference signal according to a second sequence to use a different receive beam of the high frequency base station in each different time slice of the N time slices of the second interval, wherein the uplink reference signal received the first time in the first interval is transmitted by a terminal in a first single time slice of the terminal, the uplink reference signal received the second time in the second interval is transmitted by the terminal in a second single time slice of the terminal, and wherein a guard interval is located at a first end of the uplink reference signal.

10. The method according to claim 9, wherein the first interval falls within an odd-numbered transmission time interval of uplink measurement, and the second interval falls within an even-numbered transmission time interval of uplink measurement.

11. An apparatus, comprising:
a processor, configured to determine a time domain resource sending position of an uplink reference signal of a terminal on a high frequency link, wherein a guard interval is located at a first end of the uplink reference signal; and
a transmitter, configured to:
after arriving at the time domain resource sending position, transmit the uplink reference signal a plurality of first times in a first interval and a plurality of second times in a second interval, wherein each of the first interval and the second interval are respectively divided into M time slices, wherein in the first interval the transmitter is configured to sequentially switch a current transmit beam used to send the uplink reference signal according to a first sequence to use a different transmit beam of the terminal in each different time slice of the M time slices of the first interval, and in the second interval the transmitter is configured to sequentially switch the current transmit beam used to send the uplink reference signal according to a second sequence to use a different transmit beam of the terminal in each different time slice of the M time slices of the second interval, M is a positive integer greater than 1, and the second sequence is a cyclic shift of the first sequence.

12. The apparatus according to claim 11, wherein the first interval falls within an odd-numbered transmission time interval of uplink measurement, and the second interval falls within an even-numbered transmission time interval of uplink measurement.

13. The apparatus according to claim 11, wherein the guard interval is duration in which the terminal does not transmit any signal.

14. The apparatus according to claim 11, wherein the uplink reference signal comprises a synchronization reference signal or an uplink measurement reference signal.

15. The apparatus according to claim 14, wherein the uplink measurement reference signal comprises a sounding reference signal.

16. The apparatus according to claim 11, wherein a length of the guard interval is not less than a half of a length of an uplink timing advance from the terminal to any high frequency base station within range of the terminal.

17. The apparatus according to claim 11, wherein processor being configured to determine the time domain resource sending position of the uplink reference signal of the terminal on the high frequency link comprises the processor being configured to:
obtain a system clock of a low frequency base station based on a low frequency link, and determine a start point position, indicated by the system clock, of a timeslot of the low frequency link as the time domain resource sending position of the uplink reference signal of the terminal on the high frequency link;
obtain a system clock of a low frequency base station and an uplink timing advance of the terminal on a low frequency link based on the low frequency link, and determine, as the time domain resource sending position of the uplink reference signal of the terminal on the high frequency link, a position that is a first time after a start point, indicated by the system clock, of a timeslot of the low frequency link, wherein the first time is equal to the uplink timing advance; or
receive indication information of the time domain resource sending position that is sent by a network side.

18. The apparatus according to claim 11, wherein the processor being configured to transmit the uplink reference signal the plurality of first times in the first interval comprises the transmitter being configured to:
generate a radio frame, wherein the radio frame comprises a network-oriented measurement timeslot interval, and the network-oriented measurement timeslot interval comprises the guard interval and a symbol used for uplink reference signal transmission; and
send the radio frame to transmit the uplink reference signal.

19. An apparatus, comprising:
a processor, configured to determine N time slices in a first interval for receiving an uplink reference signal transmitted a first time by a terminal, and N time slices in a second interval for receiving the uplink reference signal transmitted a second time by the terminal wherein N is a positive integer greater than 1; and
a receiver, configured to receive the uplink reference signal the first time in the first interval and the second time in the second interval, wherein in the first interval the receiver is configured to sequentially switch a receive beam used to receive the uplink reference signal according to a first sequence to use a different receive beam of the apparatus in each different time slice of the N time slices of the first interval, and wherein in the second interval the receiver is configured to sequentially switch the receive beam used to receive the uplink reference signal according to a second sequence to use a different receive beam of the apparatus in each different time slice of the N time slices of the second interval, wherein the uplink reference signal received the first time in the first interval is transmitted by a terminal in a first single time slice of the terminal, the uplink reference signal received the second time in the second interval is transmitted by the terminal in a second single time slice of the terminal, and wherein a guard interval is located at a first end of the uplink reference signal.

20. The apparatus according to claim 19, wherein the first interval falls within an odd-numbered transmission time interval of uplink measurement, and the second interval falls within an even-numbered transmission time interval of uplink measurement.

* * * * *